United States Patent [19]

Monroe et al.

[11] Patent Number: 5,611,829
[45] Date of Patent: Mar. 18, 1997

[54] ALPHA ALUMINA-BASED ABRASIVE GRAIN CONTAINING SILICA AND IRON OXIDE

[75] Inventors: Larry D. Monroe, Eagan; Thomas E. Wood, Stillwater, both of Minn.

[73] Assignee: Minnesota Mining and Manufacturing Company, St. Paul, Minn.

[21] Appl. No.: 670,890

[22] Filed: Jun. 26, 1996

Related U.S. Application Data

[63] Continuation-in-part of Ser. No. 492,898, Jun. 20, 1995, abandoned.

[51] Int. Cl.$^6$ .................................................. C09C 1/68
[52] U.S. Cl. ............................. 51/309; 501/128; 501/153
[58] Field of Search ........................... 51/293, 308, 309; 501/128, 153

[56] References Cited

U.S. PATENT DOCUMENTS

| | | |
|---|---|---|
| 3,108,888 | 10/1963 | Bugosh . |
| 3,267,041 | 8/1966 | MacCallum . |
| 3,808,015 | 4/1974 | Seufert . |

(List continued on next page.)

FOREIGN PATENT DOCUMENTS

| | | | |
|---|---|---|---|
| 394850 | 12/1991 | Austria | C04B 35/10 |
| 2014482 | 10/1990 | Canada | C01F 7/04 |
| 0256182 | 2/1988 | European Pat. Off. | C04B 35/10 |
| 0293163A3 | 11/1988 | European Pat. Off. | C04B 35/10 |
| 0294208A3 | 12/1988 | European Pat. Off. | C04B 35/00 |
| 0324513 | 7/1989 | European Pat. Off. | C04B 35/10 |
| 0373765A3 | 6/1990 | European Pat. Off. | C04B 35/10 |
| 0408771A1 | 1/1991 | European Pat. Off. | C04B 35/10 |
| 0417729A3 | 3/1991 | European Pat. Off. | B24D 3/14 |
| 0441640A2 | 8/1991 | European Pat. Off. | C04B 35/10 |
| 0441640 | 8/1991 | European Pat. Off. | C04B 35/10 |

(List continued on next page.)

OTHER PUBLICATIONS

Stephen C. Carniglia et al., *Handbook of Industrial Refractories Technology Principles, Types, Properties and Applications,* Noyes Publications, Park Ridge, New Jersey, U.S.A., 1992, "Introduction to Wet Mixes: Surface Chemistry," pp. 490–497.

J.M. Drouin et al., "Rheology and Structure of Peptized Boehmite Pastes," *Journal of Colloid and Interface Science,* vol. 125, No. 1, Sep. 1988, pp. 314–326.

Bulent E. Yoldas, "Alumina Sol Preparation from Alkoxides," *Ceramic Bulletin,* vol. 54, No. 3, 1975, pp. 289–290.

C. Jeffrey Brinker et al., *Sol–Gel Science The Physics and Chemistry of Sol–Gel Processing,* Academic Press, Inc. San Diego, CA, 1990, Chapter 1, p. 2.

Rustum Roy, "Ceramics by the Solution–Sol–Gel–Route," *Science,* vol. 238, Dec. 18, 1987, pp. 1664–1669.

"Colloidal Silica," PR–77, Nalco Chemical Company Brochure, Nov. 11, 1989.

A.R. Bunsell, *Composite Materials Series, 2 Fibre Reinforcements for Composite Materials* Elsevier Science Publishing company Inc., New York, NY, 1988, Chapter 9, pp. 427–435.

Abstract of Japanese Pat. No. JP2097457, dated Apr. 10, 1990.

*Primary Examiner*—Deborah Jones
*Attorney, Agent, or Firm*—Gary L. Griswold; Walter N. Kirn; Gregory D. Allen

[57] ABSTRACT

An alpha alumina-based ceramic abrasive grain comprising, on a theoretical oxide basis, $Al_2O_3$, $Fe_2O_3$, and $SiO_2$. The abrasive grain has a surface roughness height of greater than about 200 nanometers and a density of greater than about 3.50 g/cm$^3$. Preferably, the alpha alumina-based ceramic abrasive grain has alpha alumina crystallites having an average crystallite size of less than about 0.5 micrometer (more preferably, less than about 0.3 micrometer). The presence of the $SiO_2$ in combination with $Fe_2O_3$ increases the amount of transgranular fracture of the abrasive grain, reduces the alpha alumina crystallite growth during sintering of the abrasive grain, dilates at least one of the unit cell dimensions of the abrasive grain, and generally improves the grinding performance of the abrasive grain.

48 Claims, 1 Drawing Sheet

U.S. PATENT DOCUMENTS

| | | |
|---|---|---|
| 4,314,827 | 2/1982 | Leitheiser et al. . |
| 4,333,859 | 6/1982 | Vaughan et al. . |
| 4,623,364 | 11/1986 | Cottringer et al. . |
| 4,744,802 | 5/1988 | Schwabel . |
| 4,881,951 | 11/1989 | Wood et al. . |
| 4,898,597 | 2/1990 | Hay et al. . |
| 4,954,462 | 9/1990 | Wood et al. . |
| 4,964,883 | 10/1990 | Morris et al. . |
| 4,997,461 | 3/1991 | Markhoff-Matheny et al. . |
| 5,034,360 | 7/1991 | Bartels et al. . |
| 5,076,815 | 12/1991 | Kunz et al. . |
| 5,131,923 | 7/1992 | Markhoff-Matheny et al. ......... 51/309 |
| 5,178,849 | 1/1993 | Bauer . |
| 5,185,299 | 2/1993 | Wood et al. . |
| 5,192,339 | 3/1993 | Hasegawa et al. . |
| 5,201,916 | 4/1993 | Berg et al. . |
| 5,204,300 | 4/1993 | Kumagai et al. . |
| 5,213,591 | 5/1993 | Celikkaya et al. . |
| 5,215,551 | 6/1993 | Hatanaka et al. . |
| 5,227,104 | 7/1993 | Bauer . |
| 5,259,147 | 11/1993 | Falz et al. . |
| 5,261,930 | 11/1993 | Fliedner et al. . |
| 5,383,945 | 1/1995 | Cottringer et al. . |
| 5,395,407 | 3/1995 | Cottringer et al. ....................... 51/309 |
| 5,429,647 | 7/1995 | Larmie . |
| 5,431,705 | 7/1995 | Wood ....................................... 51/309 |
| 5,496,386 | 3/1996 | Broberg et al. . |
| 5,498,269 | 3/1996 | Larmie . |
| 5,514,631 | 5/1996 | Cottringer et al. ..................... 501/127 |
| 5,516,348 | 5/1996 | Conwell et al. . |
| 5,527,369 | 6/1996 | Garg . |
| 5,551,963 | 9/1996 | Larmie . |

FOREIGN PATENT DOCUMENTS

| | | |
|---|---|---|
| 0585761A1 | 3/1994 | European Pat. Off. ........ C04B 35/00 |
| 211384 | 6/1994 | Japan . |
| 6-321534 | 11/1994 | Japan ................................ C01F 7/30 |
| 2099012 | 12/1982 | United Kingdom ............. B24D 3/34 |
| 2186588 | 8/1987 | United Kingdom ............. B24D 3/06 |
| WO94/07809 | 4/1994 | WIPO . |
| WO94/07969 | 4/1994 | WIPO . |
| WO95/13251 | 5/1995 | WIPO . |

ALPHA ALUMINA-BASED ABRASIVE GRAIN CONTAINING SILICA AND IRON OXIDE

This application is a continuation-in-part of U.S. application having Ser. No. 08/492,898, filed Jun. 20, 1995 now abandoned.

FIELD OF THE INVENTION

The present invention pertains to abrasive grain, a method for making abrasive grain, and abrasive products (e.g., coated abrasives, bonded abrasives, and nonwoven abrasives) incorporating such abrasive grain. The abrasive grain contains alpha alumina, silica, iron oxide, and optionally other metal oxides.

DESCRIPTION OF RELATED ART

Abrasive grain has been employed in abrasive products for centuries. These abrasive products include bonded abrasives (e.g., grinding wheels), coated abrasives, and nonwoven abrasives. Preferred aggressive abrasive grain is typically tough, hard, and chemically resistant to the workpiece being abraded. A "tough" abrasive grain is generally strong and fracture resistant. A "hard" abrasive grain generally does not yield or dull from the forces of grinding. If the abrasive grain does yield or dull, this typically leads to decreased abrading performance.

One common type of aggressive abrasive grain, known as fused alumina, is formed by heating a source of aluminum oxide to a molten state, rapidly cooling, and then crushing. This type of abrasive grain is hard, tough, and chemically resistant. A more recently developed type of abrasive grain is often referred to as alpha alumina-based ceramic abrasive grain. This type of abrasive grain can be made by a sol-gel process, wherein, for example, a dispersion comprising a liquid medium (typically water), alpha alumina monohydrate, typically a peptizing agent (usually nitric acid), and optional additives such as metal oxide precursors (e.g., magnesium nitrate), is dried, crushed, calcined, and then sintered. The resultant ceramic abrasive grain is typically tougher than the fused alumina abrasive grain, and typically exhibits superior performance in abrading operations.

Some alpha alumina-based ceramic abrasive grain is prepared using a nucleating material in the sol-gel process. A nucleating material (in some instances referred to as a seed material) typically reduces the size of the alpha alumina crystallites, and enhances the density and hardness of the resultant abrasive grain. Examples of nucleating and/or seed materials include alpha-$Al_2O_3$, alpha-$Fe_2O_3$, alpha-$Cr_2O_3$, and precursors thereof. Although a number of commercial products prepared by a nucleated and/or seeded sol-gel process are available, products with improved strength and toughness are desired.

SUMMARY OF THE INVENTION

The present invention provides an alpha alumina-based ceramic abrasive grain comprising, on a theoretical oxide basis, $Al_2O_3$, $Fe_2O_3$, and $SiO_2$, with the $Al_2O_3$ present primarily as alpha alumina crystallites.

In one aspect of the invention, an alpha alumina-based ceramic abrasive grain is described comprising, on a theoretical oxide basis, $Al_2O_3$, $SiO_2$, and at least about 0.25% by weight $Fe_2O_3$, having alpha alumina crystallites with an average crystallite size of less than about 0.5 micrometer; the abrasive grain having a surface roughness height of greater than about 200 nanometers and a density of greater than about 3.5 $g/cm^3$.

In another aspect, an alpha alumina-based ceramic abrasive grain is described comprising, on a theoretical oxide basis, $Al_2O_3$, $Fe_2O_3$, $SiO_2$, and at least about 0.05% by weight of an alkali metal oxide, having alpha alumina crystallites with an average crystallite size of less than about 0.5 micrometer and a density of greater than about 3.5 $g/cm^3$.

In another aspect, the invention provides a nontranslucent alpha alumina-based ceramic abrasive grain having a surface roughness height of greater than about 200 nanometers, a density of greater than about 3.5 $g/cm^3$, and an average crystallite size of less than about 0.5 micrometer; the abrasive grain comprising, on a theoretical oxide basis, about 85.0–99.6% by weight $Al_2O_3$, about 0.25–5.0% by weight $Fe_2O_3$, about 0.1–5.0% by weight $SiO_2$, and about 0.01–1.0% by weight of alkali metal oxide, based on the total weight of the abrasive grain.

In yet another aspect, the invention provides an alpha alumina-based ceramic abrasive grain consisting essentially of, on a theoretical oxide basis, $Al_2O_3$, $Fe_2O_3$, and $SiO_2$, having alpha alumina crystailites with an average crystallite size of less than about 0.5 micrometer; the abrasive grain having a surface roughness height of greater than about 200 nanometers and a density of greater than about 3.5 $g/cm^3$.

In another aspect, the present invention provides an abrasive article comprising a binder and a plurality of abrasive grain according to the present invention secured within the article by the binder. Such abrasive article can be, for example, in the form of a coated abrasive product, a bonded abrasive product (e.g., a bonded abrasive wheel), or a nonwoven abrasive product.

The present invention also provides a method for preparing alpha alumina-based ceramic abrasive grain from a dispersion comprising liquid medium, boehmite, a source of iron oxide, and a source of silica. One preferred method comprises the steps of:

(a) preparing a dispersion comprising liquid medium, boehmite, a source of iron oxide, and a source of amorphous silica;

(b) converting the dispersion to an abrasive grain precursor; and (c) sintering the abrasive grain precursor to provide an alpha alumina-based ceramic abrasive grain comprising, on a theoretical oxide basis, $Al_2O_3$, $Fe_2O_3$, and $SiO_2$.

Another method for preparing an alpha alumina-based ceramic abrasive grain comprises the steps of:

(a) preparing a dispersion comprising boehmite, liquid medium, a source of iron oxide, and a source of amorphous silica;

(b) converting the dispersion to an abrasive grain precursor; and (c) sintering the abrasive grain precursor to provide an alpha alumina-based ceramic abrasive grain comprising, on an elemental oxide basis, $Al_2O_3$, $Fe_2O_3$, and $SiO_2$;

wherein the source of amorphous silica is present in the dispersion in an amount sufficient to provide the abrasive grain with alpha alumina crystallites having a smaller average crystallite volume than the average crystallite volume of alpha alumina crystallites present in an alpha alumina-based ceramic abrasive grain made in the same manner except without the source of amorphous silica.

Yet another method for preparing an alpha alumina-based ceramic abrasive grain comprises the steps of:

(a) preparing a dispersion comprising liquid medium, boehmite, and a source of iron oxide;

(b) forming the dispersion into porous abrasive grain precursor;

(c) impregnating the porous abrasive grain precursor with an impregnation composition comprising a sufficient amount of a source of amorphous silica to provide after steps (d) and (e) the alpha alumina-based ceramic abrasive grain with alpha alumina crystallites having an average crystallite volume less than the average crystallite volume of alpha alumina crystallites present in an alpha alumina-based ceramic abrasive grain made in the same manner without the source of amorphous silica;

(d) calcining the abrasive grain precursor resulting from step (c); and (e) heating the calcined abrasive grain precursor resulting from step (d) to provide the alpha alumina-based ceramic abrasive grain.

Another method for preparing alpha alumina-based ceramic abrasive grain comprises the steps of:

(a) preparing a dispersion comprising liquid medium, boehmite, a source of iron oxide, and a source of colloidal silica having an average particle size of less than about 150 nanometers;

(b) converting the dispersion to an abrasive grain precursor; and (c) sintering the abrasive grain precursor to provide an alpha alumina-based ceramic abrasive grain comprising, on a theoretical oxide basis, $Al_2O_3$, $Fe_2O_3$, and $SiO_2$.

The following definitions are used throughout:

"Abrasive grain precursor" or "unsintered abrasive grain" refers to a dried alumina-based dispersion (i.e., "dried abrasive grain precursor") or a calcined alumina-based dispersion (i.e., "calcined abrasive grain precursor"), typically in the form of particles, that has a density of less than 80% (typically less than 60%) of theoretical, and is capable of being sintered or impregnated with an impregnation composition and then sintered to provide alpha alumina-based ceramic abrasive grain.

"Alpha alumina-based ceramic abrasive grain," "alumina-based abrasive grain," or "abrasive grain" as used herein refers to a sintered abrasive grain that has been sintered to a density of at least 85% (preferably, at least 90% and more preferably, at least 95%) of theoretical, and contains, on a theoretical oxide basis, at least 60% by weight $Al_2O_3$, wherein at least 50% by weight of the total amount of alumina is present as alpha alumina.

"Dispersion" or "sol" refers to a solid-in-liquid two-phase system wherein one phase comprises finely divided particles (in the colloidal size range) distributed throughout a liquid. A "stable dispersion" or "stable sol" refer to a dispersion or sol from which the solids do not appear by visual inspection to begin to gel, separate, or settle upon standing undisturbed for about 2 hours.

"Impregnation composition" refers to a solution or dispersion of a liquid medium, a source of silica, a source of iron oxide, and/or a source of other metal oxides that can be impregnated into abrasive grain precursor.

"Impregnated abrasive grain precursor" refers to a dried alumina-based dispersion (i.e., "impregnated dried abrasive grain precursor") or a calcined alumina-based dispersion (i.e., "impregnated calcined abrasive grain precursor") that has a density of less than 80% (typically less than 60%) of theoretical, and has been impregnated with an impregnation composition, and includes impregnated dried particles and impregnated calcined particles.

"Nontranslucent abrasive grain" refers to abrasive grain through which images can not be seen with the unaided eye when the abrasive grain is in direct contact with a high contrast image (i.e., the text in this paragraph). This includes opaque abrasive grain, but is not limited thereto.

"Nucleating material" refers to material that enhances the transformation of transitional alumina(s) to alpha alumina. The nucleating material can be the nucleating agent itself or a precursor thereof.

"Sintering" refers to a process of heating at a temperature below the melting temperature of the material being heated to provide densification and crystallite growth to provide a tough, hard, and chemically resistant ceramic material. The alpha alumina-based ceramic abrasive grain according to the present invention is not made by a fusion process wherein heating is carried out at a temperature above the melting temperature of the material being heated.

"Solution" refers to a true solution, which is a substantially uniformly dispersed mixture at the molecular or ionic level of one or more solutes in one or more solvents.

Certain inventions described herein are claimed in copending application having U.S. Ser. No. 08/670,889 (Attorney Docket No. 51738USA8B), entitled "Method of Making Alpha Alumina-Based Abrasive Grain Containing Silica and Iron Oxide," filed on the same date as the present application, which is a continuation-in-part of U.S. application having Ser. No. 08/492,720, filed Jun. 20, 1995.

DETAILED DESCRIPTION OF PREFERRED EMBODIMENTS

Alumina-Based Dispersion

Figure 1:
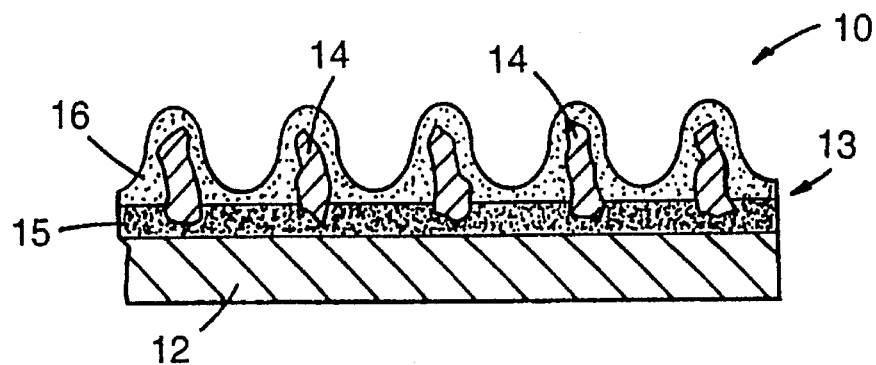
FIG. 1 is a fragmentary cross-sectional schematic view of a coated abrasive product including abrasive grain thereon, according to the present invention.

Alpha Alumina Monohydrate.

The preparation of alpha alumina ceramic abrasive grain according to the present invention using a sol-gel process includes the preparation of a dispersion of alpha alumina monohydrate (i.e., boehmite), a silica source (preferably colloidal silica), and an iron oxide source (preferably a precursor of particulate iron oxide). This can be accomplished in a number of ways. As one example, the silica and iron oxide can be combined in a dispersion and then the boehmite added either in powder form or as a dispersion.

Typically, in the systems disclosed herein, with sources of alumina other than boehmite, such as aluminum formoacetate ("AFA"), aluminum nitroformoacetate ("ANFA"), and other basic aluminum salts, it is difficult to prepare abrasive grain having an abrasive size larger than about 100 micrometers without cracks. Such cracks result in a general degradation of properties, particularly the grinding properties of the abrasive grain. In contrast, abrasive grain according to the present invention and/or made according to the method of the present invention can readily be made with a particle size of greater than about 100 micrometers.

Boehmite can be prepared using various techniques well known in the art, or it can be acquired commercially from a number of suppliers. For example, boehmite is available under the trade designation "DISPERAL" from Condea Chemie, GmbH of Hamburg, Germany, and "DISPAL" from Vista Chemical Company of Houston, Tex. These aluminum oxide monohydrates are in the alpha form, and include relatively little, if any, hydrated phases other than monohydrates (although very small amounts of trihydrate impurities can be present in some commercial grade boehmite, which can be tolerated). They have a low solubility in water, and have a high surface area (typically at least about 180 m$^2$/g). Preferably, the boehmite used to make abrasive grain according to the present invention has an average particle size of less than about 20 nanometers (more preferably, less than about 12 nanometers). In this context, "particle size" is defined by the longest dimension of a particle.

The dispersion also contains a liquid medium to disperse the boehmite. This liquid medium can be water or an organic solvent, such as lower alcohols (typically $C_{1-6}$ alcohols), hexane, or heptane. Preferably, the liquid medium is water, more preferably deionized water. A boehmite dispersion or, if desired, a boehmite gel, can be prepared using at least about 10 wt-% (preferably, about 30–80 wt-%) liquid medium (preferably, water), based on the total weight of the dispersion.

Source of Iron Oxide.

The alumina-based dispersion also includes a source of iron oxide (or iron oxide nucleating material), which, although not wanting to be bound by theory, is believed to act as, or provide a material that acts as, a nucleating agent (i.e., a material that enhances the transformation of transitional alumina(s) to alpha alumina). Sources of iron oxide include hematite (i.e., $\alpha$-Fe$_2$O$_3$), as well as precursors thereof (i.e., goethite ($\alpha$-FeOOH), lepidocrocite ($\gamma$-FeOOH), magnetite (Fe$_3$O$_4$), and maghemite ($\gamma$-Fe$_2$O$_3$)). Suitable precursors of iron oxide include any iron-containing material that, when heated, will convert to $\alpha$-Fe$_2$O$_3$.

Suitable iron oxide sources can be prepared by a variety of techniques well known in the art. For example, a dispersion of hematite ($\alpha$-Fe$_2$O$_3$) can be prepared by the thermal treatment of iron nitrate solutions, as is described, for example, by E. Matijevic et al., *J. Colloidal Interface Science*, 63, 509–24 (1978), and B. Voight et al., *Crystal Research Technology*, 21, 1177–83 (1986), the teachings of which are incorporated herein by reference. Lepidocrocite ($\gamma$-FeOOH) can be prepared, for example, by the oxidation of Fe(OH)$_2$ with a NaNO$_2$ solution. Maghemite ($\gamma$-Fe$_2$O$_3$) can be obtained, for example, by dehydrating $\gamma$-FeOOH in a vacuum. $\gamma$-FeOOH can also be converted to $\alpha$-Fe$_2$O$_3$, for example, by heating or grinding $\gamma$-FeOOH in air. Goethite ($\alpha$-FeOOH) can be synthesized, for example, by air oxidation of ferrous hydroxide or by aging a dispersion of ferric hydroxide at an elevated temperature and high pH. Additional information on the preparation of oxides of iron can be found, for example, in the articles by R. N. Sylva, *Rev. Pure Applied Chemistry*, 22, 15 (1972), and T. Misawa et al., *Corrosion Science*, 14 131 (1974), the teachings of which are incorporated herein by reference.

The type of iron oxide source employed to make abrasive grain described herein can vary. Preferably, it is a crystalline particulate material. Such particulate material can be spherical, acicular, or plate-like, depending upon the crystallinity of the particles and/or the method of preparation. Whatever the shape of the particulate material, it preferably has a surface area of at least about 60 m$^2$/g (more preferably, at least about 80 m$^2$/g, and most preferably, at least about 100 m$^2$/g) and an average particle size of less than about 1 micrometer (more preferably, less than about 0.5 micrometer). In this context, "particle size" is defined by the longest dimension of a particles. In preferred embodiments, the crystalline particles are acicular with an aspect ratio of at least about 2:1. One particularly preferred material has acicular particles with a length of about 0.04–0.1 micrometer and a width of about 0.01–0.02 micrometer. Such particles can be obtained from a variety of suppliers of magnetic media pigment such as Magnox Pulaski, Inc., Pulaski, Va.

The surface area of the particulate source of iron oxide can be measured, for example, by nitrogen absorption using a Quantasorb System OS-10 from Quantachrome Corp. of Boynton Beach, Fla. The particle size can be determined by measuring the longest dimension of the particle using a variety of techniques. For example, the particle size can be measured using a Transmission Electron Microscope, whereby a micrograph is taken of a collection of the particles at appropriate magnification and then the size of the particles is measured. Another measurement technique is Quasi Elastic Light Scattering in which a stream of light is scattered by the particles. The particle size is determined by numerical analysis of the fluctuations of the intensity of light scattered by the particles.

The presence of very small amounts of Fe$_2$O$_3$ particulate (e.g., with as little as 0.01 wt-% Fe$_2$O$_3$, on a theoretical oxide basis) is believed to aid in nucleating the transformation of transitional alumina(s) to alpha alumina. It is also believed to aid in densifying the alpha alumina at a temperature lower than densification would occur without the iron oxide (i.e., in abrasive grain made in the same manner but without the source of Fe$_2$O$_3$).

Silica Source.

The alumina-based dispersion can also contain a source of silica, preferably, amorphous silica. The source of silica can include colloidal silica, precursors of colloidal silica, as well as precursors of noncolloidal silica. That is, the source of silica can be any water-soluble or water-dispersible material that when sufficiently heated forms SiO$_2$. Suitable sources of silica include, but are not limited to, silica sols, fumed silica, silicon halides, alkoxysilanes such as tetraethoxyorthosilane, as well as siloxane polymers and oligomers.

Colloidal silica is defined herein as discrete finely divided particles of amorphous SiO$_2$ having one or more of their dimensions within a range of about 3 nanometers to about 1 micrometer. A precursor of colloidal silica can be, for example, any water-dispersible or water-soluble silica source that forms finely divided (1 nanometer to 1 micrometer) polymers or particles of SiO$_2$ upon heating. Although a precursor of colloidal silica is a material that is capable of forming finely divided SiO$_2$ particles, it should be understood that the precursor of colloidal silica need not form colloidal silica under the conditions of the reactions described herein. The term colloidal silica as used herein also encompasses chemical compounds colloidal in nature that comprise silicon and oxygen (e.g., colloidal clays). This term also includes coated colloidal silica, such as alumina-coated silica and zirconia-coated silica. Preferably, colloidal silica consists essentially of SiO$_2$.

Whether from colloidal silica directly, or from other forms or sources of colloidal silica, the average silica particle size in the colloidal silica is preferably less than about 150 nanometers, more preferably less than about 100 nanometers, and most preferably less than about 50 nanometers. In some instances, the silica particles can be on the order of about 3–10 nanometers. In most instances, the colloidal silica comprises a distribution or range of silica particle sizes. Amorphous silica of less than about 150 nanometers is more dispersible than is larger particle size silica, which results in more uniform abrasive grain.

Typically, the source of silica is added to a liquid medium, with or without the source of iron oxide, and then combined with boehmite, which is typically in the form of a dispersion. Alternatively, the source of silica in a liquid medium, with or without the source of iron oxide, can be added to abrasive grain precursor as an impregnation composition, as described in more detail below. This liquid medium can be the same or different from the liquid medium used in the boehmite dispersion. Typically, this liquid medium is water (preferably, deionized water). More preferably, the liquid medium used to disperse the source of silica (and/or the source of iron oxide) and the liquid medium used in the dispersion of boehmite are both deionized water. If colloidal silica in a liquid medium is added directly (i.e., as a dispersion rather than as a precursor solution), the percent solids in the colloidal silica dispersion is generally about 5–50% (preferably, about 15–30%), based on the total weight of the colloidal silica dispersion.

Colloidal silicas are generally prepared as basic $Na^+$ stabilized or $NH_4^+$ stabilized systems, particularly if they contain very small particles (e.g., less than about 5 nanometers). The pH of the basic colloidal silicas is generally within a range of about 8.5 to about 11.5, and typically about 9 to about 11. Acidic colloidal silicas are also commercially available, but they are not as stable as basic colloidal silicas. That is, acidic colloidal silicas tend to coagulate more readily than do basic colloidal silicas. Thus, in certain embodiments of the present invention, basic colloidal silicas are preferred because of their extended shelf life. Examples of such commercially available basic colloidal silicas include, but are not limited to, those available under the trade designations "NALCO 1115," "NALCO 1130," and "NALCO 2326" from Nalco Products, Inc. of Naperville, Ill. and "NYACOL 215" from Eka Nobel, Inc. of Augusta, Ga. Examples of an acidic colloidal silica include, but are not limited to, those available under the trade designations "NALCO 1034A" and "NALCOAG 1056" from Nalco Products, Inc. of Naperville, Ill.

During preparation of alpha alumina ceramic abrasive grain according to the present invention, the colloidal silica is typically added to an acidic dispersion of boehmite or to an acidic dispersion of a source of iron oxide. For a basic colloidal silica, this can result in undesirable agglomeration and formation of silica flocs. Thus, it is preferable to combine a basic colloidal silica with an acid source and convert it to an acidic colloidal silica dispersion (preferably having a pH of about 1–3) prior to combining it with either boehmite or the source of iron oxide. This freshly prepared acidic colloidal silica dispersion tends to provide a better abrasive grain, as exemplified by a higher density, than "older" acidic colloidal silica dispersions, which may have more coagulated particles.

Abrasive grain according to the present invention can be made by a method that includes: preparing a dispersion comprising a liquid medium, boehmite, a source of iron oxide, and a source of silica; converting this dispersion to an abrasive grain precursor; and sintering the abrasive grain precursor to provide an alpha alumina-based ceramic abrasive grain. In certain embodiments, the step of preparing a dispersion comprises: preparing a first dispersion comprising a first liquid medium and boehmite; preparing a second dispersion by combining a second liquid medium, a source of silica, and a source of iron oxide; and combining these first and second dispersions.

The presence of very small amounts of $SiO_2$ (e.g., with as little as 0.05 wt-% $SiO_2$, on a theoretical oxide basis) raises the sintering temperature, and is believed to reduce the crystallite size of the alpha alumina present in the abrasive grain when compared to abrasive grain made in the same manner with a source of $Fe_2O_3$ but without a source of $SiO_2$. The presence of very small amounts of $SiO_2$ (e.g., with as little as 0.05% $SiO_2$, on a theoretical oxide basis) is also believed to increase the amount of transgranular fracture of the abrasive grain, and to increase at least one unit cell dimension of the crystallites of abrasive grain, when compared to abrasive grain made in the same manner with a source of $Fe_2O_3$, but without a source of $SiO_2$. The presence of large amounts of silica (e.g., 8.0 wt-%), however, tends to result in significant mullite formation and poor grinding performance.

Optional Additives.

The alumina-based dispersion may also contain oxide modifiers and/or other oxide additives, which may be added to enhance some desirable property of the alpha alumina-based ceramic abrasive grain or to increase the effectiveness of the sintering step. For example, the addition of a metal oxide can alter the chemical and physical properties of the resulting abrasive grain. Typically, the addition of a metal oxide modifier can decrease the porosity of the sintered abrasive grain and thereby increase the density. The exact proportions of these components can vary depending upon the desired properties of the sintered abrasive grain.

Typically, these modifiers and/or additives are in the form of a precursor of a metal oxide (e.g., a salt such as a metal nitrate or metal acetate salt) that converts to a metal oxide upon decomposition by heating. Alternatively, the metal oxide modifiers and/or additives can be added to the alumina-based dispersion as a dispersion of particles in water. Also, they can be added as particulate material directly to the alumina-based dispersion. In this latter method, the particulate material preferably has a particle size (i.e., the longest dimension) of less than about 5 micrometers, and more preferably, less than about 1 micrometer.

Unexpectedly, two such modifiers are $Na_2O$ and $K_2O$. Typically, such alkali metal oxides are avoided in making ceramic abrasive grain because they are considered to be detrimental to the physical properties (e.g., hardness) of the abrasive grain. Significantly, however, the use of a source of an alkali metal oxide (e.g., $Na_2O$, $K_2O$, and $Li_2O$) in making abrasive grain according to the present invention provides significant advantage, particularly, it is believed, as a sintering aid to enhance densification. Surprisingly, these alkali metal oxides have been found to improve the grinding performance of the resulting abrasive grain. Thus, preferably, a sufficient amount of alkali metal oxide source is added to the alumina-based dispersion to increase the density of the abrasive grain when compared to abrasive grain made in the same manner but without the alkali metal oxide source. The alkali metal oxide source may be included in the silica source, as in basic $Na^+$-stabilized colloidal silica, or it may be added to the alumina-based dispersion as a salt, such as sodium acetate, for example. More preferably, at least about 0.01 wt-% and no more than about 1.0 wt-% alkali metal oxide (e.g., $Na_2O$) is present in the alpha alumina-based ceramic abrasive grain, on a theoretical oxide basis. Most preferably, at least about 0.05 wt-% and no more than about 0.12 wt-% alkali metal oxide is present in the alpha alumina-based ceramic abrasive grain, on a theoretical oxide basis.

Examples of other metal oxides that may be incorporated into the abrasive grain according to the present invention, but are not necessarily desirable, include magnesium oxide (MgO), zinc oxide (ZnO), cobalt oxide (CoO), nickel oxide (NiO), zirconium oxide ($ZrO_2$), titanium oxide ($TiO_2$), iron oxide ($Fe_2O_3$), yttrium oxide ($Y_2O_3$), manganese oxide (MnO), praseodymium oxide ($Pr_2O_3$), samarium oxide ($Sm_2O_3$), ytterbium oxide ($Yb_2O_3$), neodymium oxide ($Nd_2O_3$), lanthanum oxide ($La_2O_3$), gadolinium oxide ($Gd_2O_3$), cerium oxide ($Ce_2O_3$), dysprosium oxide ($Dy_2O_3$), erbium oxide ($Er_2O_3$), europium oxide ($Eu_2O_3$), hafnium oxide ($HfO_2$), chromium oxide ($Cr_2O_3$), strontium oxide (SrO), calcium oxide (CaO), and combinations thereof. Certain of these metal oxides may react with the alumina to form a reaction product with the alumina, whereas others will remain as the metal oxide. For example, the oxides of cobalt, nickel, zinc, and magnesium typically react with alumina to form a spinel, whereas zirconia and hafnia do not react with the alumina. Alternatively, the reaction product of dysprosium oxide and gadolinium oxide with aluminum oxide is generally garnet. The reaction products of praseodymium oxide, ytterbium oxide, erbium oxide, and samarium oxide with aluminum oxide generally have a perovskite and/or garnet structure. Yttria can also react with the alumina to form $Y_3Al_5O_{12}$ having a garnet crystal structure. Certain rare earth oxides and divalent metal cations react with alumina to form a rare earth aluminate represented by the formula $LnMAl_{11}O_{19}$, wherein Ln is a trivalent metal ion such as $La^{3+}$, $Nd^{3+}$, $Ce^{3+}$, $Pr^{3+}$, $Sm^{3+}$, $Gd^{3+}$, $Er^{3+}$, or $Eu^{3+}$, and metal cation such as $Mg^{2+}$, $Mn^{2+}$, $Ni^{2+}$, $Zn^{2+}$, or $Co^{2+}$. Such an aluminate has a hexagonal crystal structure. Additional disclosure about metal oxide in an alumina-based dispersion can be found, for example, in U.S. Pat. No. 4,314,827 (Leitheiser et al.), U.S. Pat. No. 4,770,671 (Monroe et al.), and U.S. Pat. No. 4,881,951 (Wood et al.), the disclosures of which are incorporated herein by reference.

It is preferred that none of these metal oxides be present in the abrasive grain above levels that result from minor contaminants in the boehmite, source of iron oxide, and/or source of silica. Thus, preferred embodiments of the abrasive grain are essentially free of metal oxides such as, for example, MgO. If any of them are present, preferably, about 0.01–25 wt-% (more preferably, about 0.01–10 wt-%, and most preferably, about 0.01–1.0 wt-%) is present in the alpha alumina-based ceramic abrasive grain, on a theoretical oxide basis. These metal oxides are not necessarily desirable because certain sources of these metal oxides (e.g., soluble salts such as nitrate salts) often migrate during drying resulting in a compositionally heterogeneous abrasive grain. Although some of these metal oxides, such as MgO, can increase the amount of the transgranular fracture of the resultant abrasive grain, they also may cause a decrease in the hardness and toughness of the abrasive grain. Silica, however, when used in combination with $Fe_2O_3$ according to the present invention, increases the amount of transgranular fracture of the resultant abrasive grain while generally retaining, and even improving, the hardness and toughness of the abrasive grain, as well as the grinding performance.

A peptizing agent, also referred to as a dispersant, is utilized to provide a boehmite dispersion. Suitable peptizing agents include monoprotic acids and acid compounds, such as acetic, hydrochloric, formic, and nitric acid. Nitric acid is a preferred peptizing agent. Multiprotic acids are normally avoided because they typically rapidly gel the dispersion, making it difficult to handle or mix with additional components. Some commercial sources of boehmite may contain the acid titer, such as absorbed formic or nitric acid, to form the dispersion.

Additionally, the alumina-based dispersion may contain small amounts of nucleating material other than the source of iron oxide, such as a source of alpha alumina nucleating material. The presence of such other nucleating material, however, depending on the particular other nucleating material present, can cause a detrimental effect on the properties of the abrasive grain. Therefore, adding a second nucleating material is not necessarily desirable.

In general, the liquid medium, alpha alumina monohydrate, source of silica, and source of iron oxide are mixed until a homogeneous mixture is formed. If a basic colloidal silica is used, it is preferably initially combined with an acid source to acidify the colloidal silica. In one embodiment, the silica source is combined with the iron oxide source in a liquid medium before it is added to the boehmite. The dispersion can be mixed or prepared by any conventional technique using, for example, a ball mill, an air stirrer, an ultrasonic mixer, a colloid mill, a continuous screw type mixer, a screw auger, or the like. A ball mill may contain any suitable milling media such as alpha alumina milling media, zirconia milling media, and the like.

In general, reducing the amount of air or gases entrapped in the dispersion before deliquifying tends to decrease the probability of frothing. Less entrapped gases generally produces a less porous microstructure, which is desirable. Degasing may be accomplished, for example, by exposing the dispersion to a vacuum during preparation. Alternatively, or additionally, defoamers may be used if desired. In addition, the level of frothing may be reduced by heating the water (e.g., to a temperature of about 60°–70° C.) in which the boehmite is dispersed.

The dispersion will typically gel prior to or during the deliquifying step. The pH of the dispersion and concentration of ions in the gel generally determines how fast the dispersion gels. Typically, the pH of the dispersion is within a range of about 1.5 to about 4. Further, the addition of most modifiers can result in the dispersion gelling faster. Alternatively, ammonium acetate or other ionic species can be added to induce gelation of the dispersion.

Optionally, the boehmite dispersion is hydrothermally treated. Methods for hydrothermally treating dispersions of boehmite at an elevated temperature are known in the art (see, e.g., U.S. Pat. No. 5,178,849 (Bauer) and U.S. Pat. No. 4,360,949 (Oberlander et al.), the disclosures of which are incorporated herein by reference). Typically, the dispersion is hydrothermally treated by heating it at a temperature in the range from about 150° C. to about 200° C. under a pressure in the range from about 5.15 kg/cm² (0.5 MPa) to about 20.6 kg/cm² (2 MPa)) for about 10 minutes to about 8 hours. For additional details regarding the hydrothermal treatment of boehmite dispersions dislcosed herein see U.S. application having Ser. No. 08/670,460, (Attorney Docket No. 52348USA6A), filed the same date as the present application, the disclosure of which is incorporated herein by reference.

Deliquifying the Dispersion and Forming Dried Abrasive Grain Precursor

The alumina-based dispersion can be deliquified, for example, by any conventional method. Such methods include simply air drying the dispersion. Other suitable methods include dewatering methods known in the art to remove the free water of the dispersion and provide a dried abrasive grain precursor. Examples of such other methods include centrifuging or filtering. Preferably, deliquifying is accomplished by heating to promote evaporation. More preferably, the heating is carried out in a forced air oven at a temperature of about 50°–200° C. (preferably, about 100°–150° C.). Such heating can be done on a batch basis or on a continuous basis. The deliquifying step generally removes a significant portion of the liquid medium from the dispersion; however, there still may be a minor portion of the liquid medium present in the dried abrasive grain precursor.

For shaped abrasive grain, the dispersion is partially deliquified until a plastic mass of the partially deliquified dispersion is formed. This partially deliquified plastic mass may be shaped by any convenient method such as pressing, molding, cutting, or extruding. It is then further deliquified to produce the desired shape (e.g., a rod, pyramid, triangular plate, diamond, cone, or the like). If the shaped abrasive grain is a rod, it can have a diameter of, for example, about 20–1000 micrometers and an aspect ratio (i.e., length to width ratio) of at least one, preferably at least two, and more preferably at least five. Irregularly shaped abrasive grain is conveniently formed by simply depositing the dispersion in any convenient size of drying vessel, such as one in the shape of a cake pan, and drying, preferably at a temperature below the frothing temperature of the dispersion.

Further, abrasive grain according to the present invention and/or made according to the present invention can be shaped, for example, into thin bodies having geometrical faces of triangles, squares, or the like, and filamentary or rod shapes. Examples of shaped abrasive grain is taught in U.S. Pat. No. 5,090,968 (Pellow) and U.S. Pat. No. 5,201,916 (Berg et al.), the disclosures of which are incorporated herein by reference.

The dried abrasive grain precursor can be converted into useful sized solid material by any conventional means, preferably by crushing. This crushing step can be done by any suitable means such as hammer mill, roll crusher, or ball mill. Any method for comminuting the dried abrasive grain precursor can be used. The term "crushing" is used to include all of such methods. It is much easier and requires significantly less energy to crush the dried abrasive grain precursor than it does to crush sintered abrasive grain. If the dried abrasive grain precursor is shaped to a desired dimension and form, then the conversion step occurs during the shaping process, and crushing is not necessary.

Calcining the Dried Abrasive Grain Precursor

The deliquified (i.e., dried) abrasive grain precursor can be further processed by calcining. Whether simply dried or dried and calcined, this material is referred to herein as an "abrasive grain precursor" or "unsintered abrasive grain." During calcining, essentially all the volatiles are removed, and the various components that were present in the dispersion are transformed into oxides. The material is generally heated to a temperature of about 400°–1000° C. (preferably, about 500°–800° C.) and held at this temperature until the free water, and preferably at least about 90 wt-% of any bound volatiles are removed. Calcining can be carried out before or after impregnation (if impregnation is carried out), or both before and after impregnation. Preferably, calcining is carried out immediately prior to sintering, whether or not an impregnation step is used.

Impregnating

An impregnating step may optionally be used in the method of making abrasive grain to incorporate silica and/or other metal oxides and additives therein. The dried or calcined material (i.e., the abrasive grain precursor) can be impregnated with an impregnation composition that includes a source of silica, a source of iron oxide, a metal oxide precursor, and combinations thereof, and a liquid medium to provide an impregnated abrasive grain precursor. After the impregnation step, the impregnated abrasive grain precursor is typically dried, if needed, and then calcined (generally, this is the second calcining step) to form an impregnated calcined abrasive grain precursor.

Although the following discussion refers to impregnating crushed abrasive grain precursor, it should be understood that the impregnation step can be carried out before the dried and/or calcined abrasive grain precursor is crushed or shaped. For random or irregular shaped abrasive grain, however, the dried abrasive grain precursor is crushed, this crushed material is then calcined, and the calcined abrasive grain precursor is impregnated.

In general, the impregnation composition (preferably, a solution) comprises an impregnation liquid and one or more of the following: a source of silica, a source of iron oxide, a source of an alkali metal oxide or other metal oxide, and combinations thereof. The impregnation liquid can be water (preferably, deionized water), or an organic solvent (preferably, a nonpolar organic solvent). If the abrasive grain precursor is calcined prior to the impregnation step, water is preferably used as the impregnation liquid. If the abrasive grain precursor is not calcined prior to the impregnation step, the impregnation liquid is one that will not dissolve or soften the abrasive grain precursor.

For enhanced penetration, the metal oxide precursor is generally in the form of a soluble salt, such as a metal nitrate or metal acetate salt. Examples of suitable metal salts that convert to an oxide include salts of magnesium, zinc, cobalt, nickel, zirconium, aluminum, titanium, iron, yttrium, praseodymium, samarium, manganese, chromium, ytterbium, neodymium, lanthanum, gadolinium, cerium, dysprosium, erbium, europium, hafnium, chromium, calcium, strontium, tin, sodium, potassium, lithium, and combinations thereof. If added by impregnation, the source of silica is also generally in the form of a soluble material, such as a solutions comprising tetraethoxyorthosilane or partially hydrolyzed alkoxy-silanes, as is the source of iron oxide, for enhanced penetration of the material into the pores.

Calcined abrasive grain precursor derived from boehmite is generally porous, typically containing pores about 30–40 Angstroms in radius. Thus, impregnation can be accomplished by mixing the calcined abrasive grain precursor with the impregnation composition, which penetrates into the pores by capillary action. If the impregnation composition has a high viscosity, it is preferred that a vacuum be present during this mixing step. Typically, sufficient impregnation composition is added to the calcined abrasive grain precursor to provide, on a theoretical oxide basis, the desired amount of $SiO_2$, $Fe_2O_3$, alkali metal oxide, or other optional metal oxide, in the resultant alpha alumina-based ceramic abrasive grain.

After impregnating, the impregnated material is dried such that individual particles do not stick together or adhere to the feed tube of the calciner. In some instances, this drying step is not necessary. Next, the material is usually calcined to remove bound volatile materials using the conditions described above. If two calcining steps are used, however, the conditions do not need to be identical.

It is within the scope of this invention to utilize more than one impregnation step. Multiple impregnating steps can increase the concentration in the pores of the material contained in the impregnation composition. The subsequent impregnation composition can also have a different concentration of solids and/or a combination of different materials than is contained in the first impregnation composition. For example, the first composition can contain one metal salt and the second composition can contain a different metal salt.

The impregnation composition may additionally include very small particles or protuberance masses (e.g., less than about 25 micrometers) of an inorganic particulate material, such as colloidal silica or a solid iron oxide source. Generally, this inorganic particulate material cannot substantially penetrate into the pores of the dried or calcined particles. Upon sintering, the inorganic particulate material sinters and adheres to the surface of the ceramic abrasive grain, thereby forming a coating on the sintered abrasive grain surface. Further information concerning this type of coating can be found, for example, in U.S. Pat. No. 5,213,591 (Celikkaya et al.) and U.S. Pat. No. 5,011,508 (Wald et al.), the disclosures of which are incorporated herein by reference.

Sintering

Sintering of the abrasive grain precursor is usually accomplished by heating at a temperature effective to transform transitional alumina(s) into alpha alumina and to cause all of the metal oxide precursors to either react with the alumina or form metal oxide. As used herein, transitional alumina is any crystallographic form of alumina that exists after heating the hydrated alumina to remove the water of hydration prior to transformation to alpha alumina (e.g., eta, theta, delta, chi, iota, kappa, and gamma forms of alumina and intermediate combinations of such forms). The sintering temperature is typically from about 1200° C. to about 1650° C. (preferably, from about 1200° C. to about 1550° C., more preferably, from about 1300° C. to about 1450° C., and even more preferably, from about 1350° C. to about 1450° C.). The length of time which the abrasive grain precursor is exposed to the sintering temperature to achieve a desired level of conversion depends on various factors, such as particle size, composition of the particles, and sintering temperature. Typically, however, sintering can be accomplished within a period of time ranging from a few seconds to about 60 minutes. Preferably, sintering is accomplished within about 5–30 minutes.

Sintering typically is performed at atmospheric pressure, although it could be done at other pressures if desired. The sintering is preferably accomplished in an oxidizing atmosphere. Sintering in a neutral or reducing atmosphere tends to reduce the iron from +3 and hinder the seeding (i.e., nucleation) efficiency. Sintering can occur, for example, in a rotary kiln, a batch (i.e., static) kiln, or a kiln such as described in the Assignee's Copending patent application Ser. No. 08/173,992, entitled "Method of Making Sintered Abrasive Grains and Apparatus for Sintering Abrasive Grain" (Conwell et al.), filed Dec. 28, 1993, the disclosure of which is incorporated herein by reference. The preferred kiln is a rotary kiln.

After sintering, the abrasive grain can be further processed by screening, or crushing and screening into the desired size distribution.

Abrasive Grain

Abrasive grain according to the present invention and/or made according to the method of the present invention, is preferably nontranslucent and contains alumina ($Al_2O_3$), silica ($SiO_2$), and iron oxide ($\alpha$-$Fe_2O_3$), as well as alkali metal oxides for certain embodiments. It typically has an abrasive grain size (i.e., the longest dimension of the abrasive grain) of at least about 10 micrometers. The abrasive grain described herein can be readily made with an abrasive grain size of greater than about 100 micrometers, but larger abrasive grain (e.g., greater than about 150 micrometers or even greater than about 200 micrometers) can also be readily made. The abrasive grain sizes referred to herein are typically average abrasive grain sizes, although, preferably, for a sample that is said to have "greater than" a particular abrasive grain size, substantially all the grain of the sample is greater than that particular value.

Abrasive grain according to the present invention, and/or made according to the method of the present invention, typically has a surface roughness height of greater than about 200 nanometers (preferably, greater than about 300 nanometers), and a surface roughness periodicity of less than about 500 nanometers (preferably, less than about 250 nanometers). This surface roughness contributes to the adhesion of the abrasive grain, for example, to the binder in an abrasive article. The methods by which surface roughness height and periodicity can be determined are described herein below.

The microstructure of the sintered abrasive grain can be described as randomly oriented, faceted, equiaxed alpha alumina crystallites having an average diameter of less than about 0.5 micrometer, preferably less than about 0.3 micrometer. That is, at least a portion of the alpha alumina is present as alpha alumina crystallites having a mean crystallite size of less than about 0.5 micrometer. There is generally no alpha-alumina crystallite greater than 1 micrometer, and they typically range in size from about 0.1–0.4 micrometer. As used in this context, the crystallite size is the longest dimension of the crystallite. Typically, the crystallite volume can be determined by cubing this longest dimension.

The alpha alumina-based ceramic abrasive grain according to the present invention, and/or made according to the method of the present invention, has a density of at least about 3.5 g/cm$^3$, more preferably, at least about 3.7 g/cm$^3$, and most preferably, at least about 3.8 g/cm$^3$. In general, the abrasive grain is both hard (i.e., resistant to deformation) and tough (i.e., resistant to fracture). The abrasive grain typically has an average hardness (i.e., resistance to deformation) of at least about 16 GPa. Preferably, the average hardness is at least about 18 GPa, more preferably at least about 20 GPa, and most preferably at least about 22 GPa. In another aspect, the sintered abrasive grain typically has an average toughness (i.e., resistance to fracture) of at least about 2.5 MPa·m$^{1/2}$. Preferably, the average toughness is at least about 3.0 MPa·m$^{1/2}$, more preferably at least about 3.5 MPa·m$^{1/2}$, and most preferably at least about 4.0 MPa·m$^{1/2}$. A particularly preferred abrasive grain has an average hardness of at least 23 GPa and an average toughness of at least 3.3 MPa·m$^{1/2}$.

Although not intending to be bound by theory, it is believed that the iron oxide aids in nucleating the transformation of transitional alumina(s) to alpha alumina. The iron oxide is also believed to aid in densifying the alpha alumina at a temperature lower than densification would occur without the iron oxide, whereas the silica is believed to aid in reducing alpha alumina crystallite growth during sintering, although it raises the sintering temperature. Thus, an amount of iron oxide and an amount of silica are used to effectively transform transitional alumina(s) to alpha alumina while reducing the crystallite growth of the alpha alumina. Preferably, the alumina-based dispersion contains a sufficient amount of iron oxide source and a sufficient amount of silica source to produce alpha alumina-based ceramic abrasive grain having alpha alumina crystallites with an average crystallite size of less than about 0.5 micrometer (more preferably, less than about 0.3 micrometer).

In general, reduced crystallite growth is observed at very low levels (e.g., 0.05%) of $SiO_2$ during sintering of the abrasive grain precursor. Preferably, the $SiO_2$ is present in the abrasive grain in an amount sufficient to provide abrasive grain with alpha alumina crystallites having an average crystallite volume smaller than the average crystallite volume of alpha alumina crystallites present in an alpha alumina-based ceramic abrasive grain made in the same manner except without the source of silica. Preferably, the average crystallite volume is at most one half (more preferably, one fifth, most preferably, one tenth, and in particularly preferred embodiments, one hundredth) of the average crystallite volume of alpha alumina crystallites present in an alpha alumina-based ceramic abrasive grain made in the same manner except without the source of silica.

Abrasive grain described herein, which have little or no glassy phases, exhibit transgranular fracture, as opposed to intergranular fracture, when the abrasive grain has been sintered to a "real" density of at least 90% of theoretical. A very porous abrasive grain (e.g., one having continuous porosity wherein the internal and external pores are connected such as is found in materials having a vennicular or porous non-seeded microstructure) will have a very high "apparent" density and a very high (e.g., greater than about 70%) amount of transgranular fracture. In this case, the amount of transgranular fracture is meaningless as porous material tends to fracture in a transgranular manner. It will be understood by one of skill in the art that abrasive grain according to the present invention has a seeded and dense microstructure with very few pores (as determined by the Red Dye Test described herein below, which identifies external porosity, and/or scanning electron microscopy, which identifies both external and internal porosity). For such nonporous abrasive grain, the measured or "apparent" density is a "real" density. In this case, a high amount of transgranular fracture generally indicates a tougher abrasive grain with generally better grinding performance.

The amount of transgranular fracture can be determined as described herein below using scanning electron microscopy. In general, transgranular fracture is observed at very low levels (e.g., 0.05 wt-%) of $SiO_2$; however, transgranular fracture, grinding performance, and toughness improves with higher levels (e.g., 0.1 wt-% and particularly at 1–2 wt-%) of $SiO_2$. Thus, preferably, the $SiO_2$ is present in the abrasive grain in an amount sufficient to provide abrasive grain having an increased amount of transgranular fracture when compared to abrasive grain made in the same manner but without the $SiO_2$. More preferably, the $SiO_2$ is present in an amount sufficient to provide abrasive grain having at least about 30% transgranular fracture, most preferably at least about 40% transgranular fracture, and in certain embodiments, at least about 50% transgranular fracture. As the amount of transgranular fracture increases, generally so does the grinding performance.

When $Fe_2O_3$ is incorporated into an aluminous ceramic material, it is known to dilate the unit cell dimensions of the alpha alumina crystallites. Surprisingly, the presence of $SiO_2$ enhances this dilation effect at very low levels (e.g., 0.05 wt-%) of $SiO_2$. Thus, preferably, the $SiO_2$ is present in the abrasive grain in an amount sufficient to provide abrasive grain having at least one increased unit cell dimension when compared to abrasive grain without the $SiO_2$. More preferably, the $SiO_2$ is present in an amount sufficient to provide abrasive grain having at least about 0.01% dilation of at least one unit cell dimension, and most preferably at least about 0.02% dilation, when compared to abrasive grain without the $SiO_2$.

In certain embodiments, the abrasive grain preferably contains, on a theoretical oxide basis, at least about 0.1 wt-% (more preferably, at least about 0.5 wt-%, and most preferably, at least about 1.0 wt-%) $SiO_2$. Furthermore, the abrasive grain preferably contains, on a theoretical oxide basis, no greater than about 20.0 wt-% (more preferably, no greater than about 5.0 wt-%, and most preferably, no greater than about 2.0 wt-%) $SiO_2$.

In certain embodiments, the abrasive grain preferably contains, on a theoretical oxide basis, at least about 0.1 wt-% (more preferably, at least about 0.25 wt-%, most preferably, at least about 0.5 wt-%, and in certain embodiments, at least about 1.0 wt-%) $Fe_2O_3$. Furthermore, the abrasive grain preferably contains, on a theoretical oxide basis, no greater than about 10.0 wt-% (more preferably, no greater than about 5.0 wt-%, and most preferably, no greater than about 2.0 wt-%) $Fe_2O_3$.

Generally, the abrasive grain according to the present invention and/or made according to the method of the present invention preferably includes at least about 70.0 wt-% (more preferably, at least about 85.0 wt-%) $Al_2O_3$, based on the total weight of the abrasive grain. Furthermore, the abrasive grain preferably includes no greater than about 99.9 wt-% $Al_2O_3$ (more preferably, no greater than about 99.6 wt-%, and most preferably, no greater than about 98.0 wt-%), based on the total weight of the abrasive grain.

As indicated above, the alpha alumina-based ceramic abrasive grain according to the present invention, and/or made according to the method of the present invention, can include an alkali metal oxide (e.g., $Na_2O$, $K_2O$, or $Li_2O$) for certain advantage. Typically, however, the abrasive grain consists essentially of $Al_2O_3$, $Fe_2O_3$, and $SiO_2$.

Abrasive Products

Abrasive grain according to the present invention and/or made according to the method of the present invention, can be used in conventional abrasive products, such as coated abrasive products, bonded abrasive products (including grinding wheels, cutoff wheels, and honing stones), nonwoven abrasive products, and abrasive brushes. Typically, abrasive products (i.e., abrasive articles) include a binder and abrasive grain, at least a portion of which is the abrasive grain according to the present invention and/or made according to the method of the present invention,, secured within the abrasive product by the binder. Methods of making such abrasive products are well known to those skilled in the art. Furthermore, abrasive grain according to the present invention and/or made according to the method of the present invention, can be used in abrasive applications that utilize slurries of abrading compounds (e.g., polishing compounds).

Coated abrasive products generally include a backing, abrasive grain, and at least one binder to hold the abrasive grain on the backing. The backing can be any suitable material, including cloth, polymeric film, fibre, nonwoven webs, paper, combinations thereof, and treated versions thereof. The binder can be any suitable binder, including an inorganic or organic binder. The abrasive grain can be present in one layer or in two layers of the coated abrasive product. Preferred methods of making coated abrasive products are described, for example, in U.S. Pat. No. 4,734,104 (Broberg) and U.S. Pat. No. 4,737,163 (Larkey), the disclosures of which are incorporated herein by reference.

The coated abrasive product can have an attachment means on its back surface to secure the coated abrasive product to a support pad or backup pad. Such attachment means can be, for example, a pressure sensitive adhesive or a loop fabric for a hook and loop attachment. The back side of the coated abrasive product may also contain a slip resistant or frictional coating. Examples of such coatings include an inorganic particulate material (e.g., calcium carbonate or quartz) dispersed in an adhesive.

An example of a coated abrasive product is depicted in FIG. 1. Referring to this figure, coated abrasive product 10 has a backing (substrate) 12 and abrasive layer 13. Abrasive layer 13 includes abrasive grain 14 secured to a major surface of backing 12 by make coat 15 and size coat 16. In some instances, a supersize coat (not shown) is used.

Figure 2:
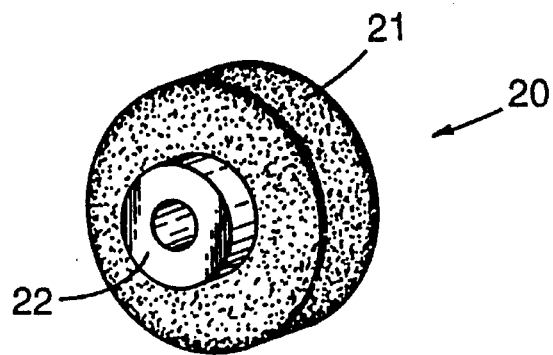
FIG. 2 is a perspective view of a bonded abrasive product including abrasive grain therein, according to the present invention.

Bonded abrasive products typically include a shaped mass of abrasive grain held together by an organic, metallic, or vitrified binder. Such shaped mass can be, for example, in the form of a wheel, such as a grinding wheel, cutoff wheel, or the like. It can also be in the form, for example, of a honing stone or other conventional bonded abrasive shape. It is preferably in the form of a grinding wheel. In FIG. 2, wheel 20 is depicted, which includes abrasive grain 21, at least a portion of which is the abrasive grain according to the present invention and/or made according to the method of the present invention,, molded in a wheel and mounted on hub 22. For further details regarding bonded abrasive products, see, for example, U.S. Pat. No. 4,997,461 (Markhoff-Matheny et al.), the disclosure of which is incorporated herein by reference. Preferred binders that can be used are curable at temperatures and under conditions that will not adversely affect the ceramic abrasive grain according to the present invention.

Figure 3:
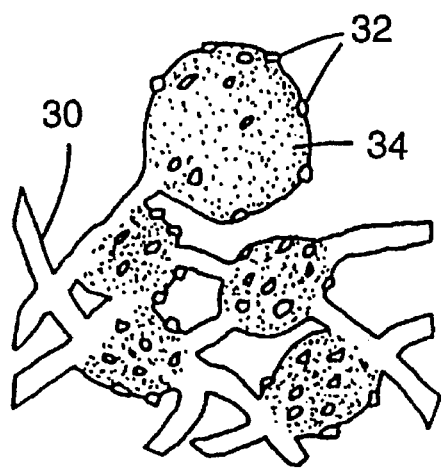
FIG. 3 is an enlarged schematic view of a nonwoven abrasive product incorporating abrasive grain according to the present invention.

Nonwoven abrasive products typically include an open porous lofty polymer filament structure having abrasive grain distributed throughout the structure and adherently bonded therein by an organic binder. Examples of filaments include polyester fibers, polyamide fibers, and polyaramid fibers. In FIG. 3, a schematic depiction, enlarged about 100×, of a typical nonwoven abrasive product is provided. Such a nonwoven abrasive product comprises fibrous mat 30 as a substrate, onto which abrasive grain 32, at least a portion of which is the abrasive grain according to the present invention and/or made according to the method of the present invention, are adhered by binder 34. For further details regarding nonwoven abrasive products, see, for example, U.S. Pat. No. 2,958,593 (Hoover et al.), the disclosure of which is incorporated herein by reference.

Suitable organic binders for the abrasive products according to the present invention include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant $\alpha,\beta$-unsaturated carbonyl groups, epoxy resins, and combinations thereof. The binder and/or abrasive product can also include additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the desired properties. The coupling agents can improve adhesion to the abrasive grain and/or the filler.

The binder can also contain filler materials or grinding aids, typically in the form of a particulate material. Typically, the particulate materials are inorganic materials. Examples of particulate materials that act as fillers include metal carbonates, silica, silicates, metal sulfates, metal oxides, and the like. Examples of particulate materials that act as grinding aids include: halide salts such as sodium chloride, potassium chloride, sodium cryolite, and potassium tetrafluoroborate; metals such as tin, lead, bismuth, cobalt, antimony, iron, and titanium; organic halides such as polyvinyl chloride and tetrachloronaphthalene; sulfur and sulfur compounds; graphite; and the like. A grinding aid is a material that has a significant effect on the chemical and physical processes of abrading, which results in improved performance. In a coated abrasive product, a grinding aid is typically used in the supersize coat applied over the surface of the abrasive grain, although it can also be added to the size coat. Typically, if desired, a grinding aid is used in an amount of about 50–300 g/m$^2$ (preferably, about 80–160 g/m$^2$) of coated abrasive product.

Abrasive grain according to the present invention and/or made according to the method of the present invention, can include a surface coating. Surface coatings are known to improve the adhesion between the abrasive grain and the binder in abrasive products, and in some cases to improve the abrading properties of the abrasive grain. Such surface coatings are, for example, described in U.S. Pat. No. 5,011,508 (Wald et al.), U.S. Pat. No. 5,009,675 (Kunz et al.), U.S. Pat. No. 4,997,461 (Markhoff-Matheny et al.), U.S. Pat. No. 5,213,951 (Celikkaya et al.), U.S. Pat. No. 5,085,671 (Martin et al.), and U.S. Pat. No. 5,042,991 (Kunz et al.), the disclosures of which are incorporated herein by reference.

The abrasive products can contain 100% abrasive grain according to the present invention and/or made according to the method of the present invention, or they can contain a blend of abrasive grain according to the invention with conventional abrasive grain and/or diluent particles. However, at least about 15% by weight, and preferably about 50–100% by weight, of the abrasive grain in the abrasive products should be abrasive grain according to the present invention. Examples of suitable conventional abrasive grain include fused aluminum oxide, silicon carbide, garnet, fused alumina zirconia, other sol-gel abrasive grain, and the like. Examples of suitable diluent particles include marble, gypsum, flint, silica, iron oxide, aluminum silicate, glass, and diluent agglomerates. Abrasive grain according to the present invention can also be combined in or with abrasive agglomerates. An example of an abrasive agglomerate is described in U.S. Pat. No. 4,311,489 (Kressnet), U.S. Pat. No. 4,652,275 (Bloecher et al.), and U.S. Pat. No. 4,799,939 (Bloecher et al.), the disclosures of which are incorporated herein by reference.

Examples

This invention is further illustrated by the following examples, but the particular materials and amounts thereof recited in these examples, as well as other conditions and details, should not be construed to unduly limit this invention. Various modifications and alterations of the invention will become apparent to those skilled in the art. All parts and percentages are by weight unless otherwise indicated.

The following designations are used in the examples:

AAMH alpha-alumina monohydrate (boehmite) commercially available from Condea Chemie, Hamburg, Germany, under the trade designation "DISPERAL."

DWT1 deionized water.

DWT2 deionized water that was at a temperature of 60°–65° C.

HNO$_3$ nitric acid.

AMM ammonium acetate.

TEOS tetraethoxyorthosilane.

ASM an alpha-alumina seed aqueous dispersion; prepared by milling approximately 5200 grams alumina milling media (0.25 inch (0.64 cm) long and 0.25 inch (0.64 cm) diameter) alumina rod from Coors of Golden, Colo.) in about 750 ml H$_2$O in a 4-liter ball mill jar (inside diameter=21 cm) for 72 hours at 60 rpm.

ASG an alpha alumina seed, median particle size=0.4 micrometer, surface area=8.2 m$^2$/g; commercially available from Alcoa Industrial Chemicals of Bauxite, Ak. under the trade designation "ALCOA A16SG."

SAS an alpha-alumina seed sol, prepared by milling 50.0 grams ASG, 5 ml of concentrated HNO$_3$, and 400 ml DWT1 in an alumina ball mill charged to about ⅓ of its volume with cylindrical alumina mill media (consisting of equal amounts of 0.5 inch (1.3 cm) balls, 0.5 inch (1.3 cm) cylinders, and 0.75 inch (1.9 cm) cylinders) for about 48 hours.

IO-1 an iron oxyhydroxide (γ-FeOOH), aqueous dispersion (pH=5.0–5.5), about 90 to 95% of which is lepidocrocite, acicular particles with an average particle size of about 0.05 to 0.1 micrometer, a length to diameter or width ratio of about 1:1 to 2:1, and a surface area of about 115.3 m$^2$/g.

IO-2 an iron oxyhydroxide (α-FeOOH) aqueous dispersion, acicular particles with an average particle size of less than 0.1 micrometer.

IO-3 an iron oxyhydroxide (α-FeOOH), aqueous dispersion, 15% iron oxide (calculated on a theoretical oxide basis as Fe$_2$O$_3$), produced from iron sulfate and ammonium hydroxide, acicular particles approximately 0.4 micrometer in length and 0.05 micrometer in width, surface area about 80 m$^2$/g. This dispersion was aged for about 3 years.

IO-4 an aqueous dispersion of iron oxide (α-Fe$_2$O$_3$) nucleating agent, prepared according to Example 2 of U.S. Pat. No. 3,267,041 (MacCallum), the disclosure of which is incorporated herein by reference, except that the Fe(NO$_3$)$_3$.9H$_2$O, water, and aqueous ammonia were each used in an amount of five times that specified by MacCallum, discus-shaped particles with an average particle size of about 0.2–0.3 micrometer.

IO-5 an aqueous dispersion (pH=1) of iron oxide (α-Fe$_2$O$_3$) made by hydrothermal treatment of a hydroxy iron polymer, flattened ellipsoidal particles with an average particle size of about 0.1 micrometer.

IO-6 an aqueous-based paste of iron oxyhydroxide (α-FeOOH), acicular particles with an average particle size of about 0.08 micrometer and a surface area of about 104.5 m$^2$/g, available from Magnox Pulaski, Inc. of Pulaski, Va. under the designation "Goethite A."

IO-7 an α-FeOOH dispersion (0.08 micrometer average length acicular particles, surface area about 130.7 m$^2$/g, 1.4% solids, pH approximately 8.7) prepared by dissolving 83.4 grams FeSO$_4$.7H$_2$O in 2000 grams DWT1, heating the solution to 40° C. and bubbling O$_2$ therein, adding NaOH solution (30 grams NaOH in 500 grams DWT1) and stirring while continuing to bubble O$_2$; and maintaining the temperature for 4 hours; this suspension was centrifuged for 6 minutes at 2400 rpm, and the particles were redispersed in DWT1, and repeated 3 times; allowed to settle overnight.

IO-8 an iron oxyhydroxide (α-FeOOH), aqueous dispersion, 15% iron oxide (calculated on a theoretical oxide basis as Fe$_2$O$_3$), produced from iron sulfate and ammonium hydroxide, acicular particles approximately 0.4 micrometer in length and 0.05 micrometer in width, surface area about 80 m$^2$/g. This material is similar to IO-3, but the dispersion was freshly prepared.

IO-9 an α-FeOOH aqueous dispersion, 23.4% iron oxide (calculated on a theoretical oxide basis as Fe$_2$O$_3$), acicular particles approximately 40 nanometers in length, surface area of about 200 m$^2$/g.

CS1 basic colloidal silica (15% solids, 0.75% Na$_2$O) commercially available from Eka Nobel, Inc. of Augusta, Ga. under the trade designation "NYACOL 215," average particle size 5 nm.

CS2 basic colloidal silica (15% solids, 0.75% Na$_2$O) commercially available from Nalco Products, Inc. of Naperville, Ill. under the trade designation "NALCO 1115," average particle size 5 nm CS3 basic colloidal silica (15% solids, NH$_3^+$ stabilized) commercially available from Nalco Products, Inc. under the trade designation "NALCO 2326", average particle size 5 nm.

CS4 basic colloidal silica (30% solids, 0.65% Na$_2$O) commercially available from Nalco Products, Inc. under the trade designation "NALCO 1130," average particle size 8 nm.

CS5 acidic colloidal silica (34% by weight solids) commercially available from Nalco Products, Inc. under the trade designation "NALCOAG 1034A," average particle size 20 nm.

CS6 acidic alumina-coated colloidal silica (20% SiO$_2$, 4% Al$_2$O$_3$) commercially available from Nalco Products, Inc. under the trade designation "NALCOAG 1SJ613," average particle size 20 nm.

CS7 colloidal silica (50% by weight solids) commercially available from Nyacol Products, Inc. under the trade designation "NYACOL 5050", average particle size 50 nm.

CS8 colloidal silica (50% by weight solids) commercially available from Nyacol Products, Inc. under the trade designation "NYACOL 9950", average particle size 99 nm.

EXAMPLES 1–4 AND COMPARATIVE EXAMPLE A

An alumina-based dispersion was made for each of Examples 1–4 and Comparative Example A. Each dispersion was made by mixing together 500 grams of AAMH, 35 grams of HNO$_3$, 60 grams of IO-1 having 6.5% iron oxide (calculated on a theoretical oxide basis as Fe$_2$O$_3$), and 1350 grams of DWT2. A colloidal silica was mixed into the alumina dispersion for each of Examples 1–4 in the amount and type listed in Table 1, below.

TABLE 1

| Additions of Colloidal Silica to the Alumina-Based Dispersion | | |
|---|---|---|
| Example | Amount of silica, g | Silica source |
| 1 | 38.5 | CS2 |
| 2 | 38.5 | CS3 |
| 3 | 19.0 | CS4 |
| 4 | 38.5 | CS1 |
| Comp. A | 0.0 | — |

The alumina-based dispersions each gelled, were placed into "PYREX" trays, and dried overnight at approximately 93° C. (200° F.) to provide friable solids. The resulting dried materials were crushed using a "Braun" type UD pulverizer having a 1.1 mm gap between the steel plates (available from Braun Corp., Los Angeles, Calif.) to form abrasive grain precursor. The crushed abrasive grain precursors were each screened between 0.125 to 1 mm screen size. The retained abrasive grain precursors were each fed into a calcining kiln to form calcined abrasive grain precursor. The calcining kiln was a 15 cm diameter, 1.2 meter long, stainless steel tube having a 0.3 meter hot zone. The tube was inclined at a 2.4 degree angle with respect to the horizontal. The tube rotated at about 20 rpm, to provide a residence time within the calcining kiln of about 4 to 5 minutes. The calcining kiln had a hot zone temperature of about 650° C. Next, the calcined abrasive grain precursor was fed into a sintering kiln. The sintering kiln was an 8.9 cm inner diameter, 1.32 meter long silicon carbide tube inclined at 4.4 degrees with respect to the horizontal and had a 31 cm hot zone. The heat was applied externally via SiC electric heating elements. The sintering kiln rotated at 2.8 rpm, to provide a residence time in the kiln of about 25 minutes.

The alpha alumina ceramic abrasive grain of Comparative Example A was sintered at a temperature of about 1290° C., whereas the abrasive grain of Examples 1–4 was sintered at a temperature of 1430° C. The presence of silica in Examples 1–4 required a higher sintering temperature than needed for the abrasive grain of Comparative Example A. The product exited the kiln into room temperature air where it was collected in a metal container and allowed to cool to room temperature.

The density of the abrasive grain for each of Examples 1–4 was measured with a helium gas pycnometer available under the trade designation "Micromeritics AccuPyc 1330" (from Micromeritics Instruments Corp., Norcross, Ga.). The density values are listed in $g/cm^3$ units.

The microhardnesses were measured by mounting loose abrasive grain in "EPOMET" mounting resin (from Buehler Ltd., Lake Bluff, Ill.) to form a cylinder containing the abrasive grain measuring 1 inch (2.5 cm) in diameter and 0.75 inch (1.9 cm) tall. The mounted samples were polished using an "EPOMET" grinder/polisher (from Buehler Ltd.) using "METADI" diamond slurvies (from Buehler Ltd.) to obtain polished cross-sections of the samples. The final polishing step used a 1 micrometer "METADI" diamond slurry. The hardness measurements were made using a "Mitutoyo MVK-VL" hardness tester (from Mitutoyo Corp of Tokyo, Japan) fitted with a Vickers indenter using a 500-gram indent load. The hardness measurements were made according to the guidelines stated in ASTM Test Method E384 Test Methods for Microhardness of Materials (1991), the disclosure of which is incorporated herein by reference. The hardness values, which are an average of five measurements, wherein each measurement was done on a separate abrasive grain, are listed in GPa units.

The density and hardness of the abrasive grain of Examples 1–4 were measured and are reported in Table 2, below.

TABLE 2

| Example | $Al_2O_3$, % | $Fe_2O_3$, % | $SiO_2$, % | Density, $g/cm^3$ | Hardness, GPa |
|---|---|---|---|---|---|
| 1 | 97.5 | 1.0 | 1.5 | 3.91 | 23.9 |
| 2 | 97.5 | 1.0 | 1.5 | 3.87 | 23.7 |
| 3 | 97.5 | 1.0 | 1.5 | 3.91 | 23.8 |
| 4 | 97.5 | 1.0 | 1.5 | 3.98 | 23.0 |

The alpha alumina ceramic abrasive grain of Examples 1–4 and Comparative Example A were utilized in coated abrasive discs, which were tested for grinding performance. The coated abrasive discs were made according to conventional procedures. The abrasive grain was screened to provide an approximate grade 36, wherein 100% of the abrasive grain passed through a 25 mesh screen (U.S. Standard screen with an opening size of 0.707 mm) and of that 50% was retained on a 30 mesh screen (U.S. Standard screen with an opening size of 0.595 mm) and 50% passed through the 30 mesh screen and was retained on a 35 mesh screen (U.S. Standard screen with an opening size of 0.500 mm). The abrasive grain was bonded to 17.8 cm diameter vulcanized fiber backings (having a 2.2 cm diameter center hole) using a conventional calcium carbonate-filled phenolic make resin (48% resole phenolic resin, 52% calcium carbonate, diluted to 81% solids with water and glycol ether) and a conventional cryolite-filled phenolic size resin (32% resole phenolic resin, 2% iron oxide, 66% cryolite, diluted to 78% solids with water and glycol ether). The make resin was precured for 90 minutes at 88° C. and the size resin precured for 90 minutes at 88° C., followed by a final cure of 10 hours at 100° C.

The coated abrasive discs were tested according to the following test procedure. Each coated abrasive disc was mounted on a beveled aluminum back-up pad, and used to grind the face of a preweighed 1.25 cm×18 cm 1018 mild steel workpiece. The disc was driven at 5,500 rpm while the portion of the disc overlaying the beveled edge of the back-up pad contacted the workpiece at about a 6 kg (13 pound) load. Each disc was used to grind individual workpieces in sequence for one-minute intervals. The total cut was the sum of the amount of material removed from the workpieces throughout the test period. The performance of the abrasive grain was stated as a percent of control. That is, the total amount of metal removed for the control sample was equated to 100% and the test samples were measured relative to the 100%. There were approximately four discs per example tested. The test results are listed in Table 3, below.

TABLE 3

| | Grinding Data (12-minute test) |
|---|---|
| Example | Total cut, % of Comp. A |
| 1 | 128 |
| 2 | 125 |
| 3 | 125 |
| 4 | 135 |
| Comp. A | 100 |

These examples demonstrate that abrasive grain made with boehmite, a source of iron oxide, and a source of silica possess better grinding performance than abrasive grain made in the same manner but without a source of silica.

EXAMPLES 5–6

The abrasive grain of Examples 5 and 6 were made according to the procedure outlined above for Examples 1–4, except that the dispersion of Example 5 consisted of 1300 grams DWT2, 36 grams $HNO_3$, 47 grams CS1, 234 grams IO-1 having 2.4% iron oxide (calculated on a theoretical oxide basis as $Fe_2O_3$), and 600 grams AAMH, and the dispersion of Example 6 consisted of 1450 grams DWT2, 36 grams $HNO_3$, 47 grams CS1, 37 grams IO-2, and 600 grams AAMH. The sintering temperature was 1430° C. The hardness and density of the resultant abrasive grain were measured as described in Examples 1–4 and are listed in Table 4, below. The grinding performance was not measured.

TABLE 4

| Example | Al$_2$O$_3$, % | Fe$_2$O$_3$, % | SiO$_2$, % | Density, g/cm$^3$ | Hardness, GPa |
|---|---|---|---|---|---|
| 5 | 97.3 | 1.2 | 1.5 | 3.89 | 22.6 |
| 6 | 97.3 | 1.2 | 1.5 | 3.81 | 20.4 |

These examples demonstrate that alternative iron oxide sources can produce abrasive grain having similar properties.

EXAMPLES 7–10

The abrasive grain of Examples 7–10 were made according to the procedure outlined for Examples 1–4, respectively, except that each of the dispersions had 600 grams AAMH, 36 grams HNO$_3$, and 1300 grams DWT2, in addition to the materials listed in Table 5, below.

TABLE 5

| Example | Iron Oxide Source | Silica Source |
|---|---|---|
| 7 | 234 grams IO-1* | 47 grams CS1 |
| 8 | 37 grams IO-3 | 47 grams CS1 |
| 9 | 390 grams IO-1* | 31 grams CS1 |
| 10 | 62 grams IO-3 | 31 grams CS1 |

*IO-1 having 2.4% iron oxide (calculated on a theoretical oxide basis as Fe$_2$O$_3$).

The resulting gels were dried overnight at 100° C., crushed, calcined, and sintered at 1430° C. in the manner described above in Examples 1–4.

The abrasive grain of Examples 8–10 were evaluated using a "Red Dye Test," which measured the surface and internal porosity, based on the penetration of a red dye into the surface and internal porosity of the abrasive grain. More specifically, a sample of alpha alumina-based ceramic abrasive grain was placed in a flask containing a red penetrating dye (available under the trade designation "P-303 A Penetrant" from Uresco Andfox of Cerritos, Calif.). The abrasive grain was thoroughly mixed to ensure complete coverage with the dye. The dye was decanted off and the particles rinsed with deionized water several times to remove any residual dye. A final red color of the abrasive grain from the dye denoted a highly porous abrasive grain, while an abrasive grain that did not exhibit the red color was deemed to have essentially no porosity connected to the surface of the abrasive grain.

The abrasive grain of Examples 8 and 10 failed the Red Dye Test (i.e., the abrasive grain exhibited a significant red color), whereas the abrasive grain of Examples 7 and 9 passed the Red Dye Test (i.e., exhibited no external porosity). It is believed that the poor results for the abrasive grain of Examples 8 and 10 were a result of the iron oxide nucleating material, which had been prepared several years (about 3 years) before being used. The densities of the abrasive grain of Examples 7 and 9 are listed in Table 6, below.

TABLE 6

| Example | Al$_2$O$_3$, % | Fe$_2$O$_3$, % | SiO$_2$, % | Density, g/cm$^3$ |
|---|---|---|---|---|
| 7 | 97.3 | 1.2 | 1.5 | 3.91 |
| 8 | 97.3 | 1.2 | 1.5 | — |
| 9 | 97.0 | 2.0 | 1.0 | 3.94 |
| 10 | 97.0 | 2.0 | 1.0 | — |

These examples demonstrate the benefit of smaller iron oxide particle size as exemplified by IO-1.

EXAMPLES 11 AND 12 AND COMPARATIVE EXAMPLE B

The abrasive grain of Examples 11 and 12 were made according to the procedure outlined for Examples 1–4 except that the dispersion of Example 11 consisted of 600 grams AAMH, 36 grams HNO$_3$, 47 grams CS1, 562 grams IO-1 having 1.0% iron oxide (calculated on a theoretical oxide basis as Fe$_2$O$_3$), and 950 grams DWT2, and the dispersion of Example 12 consisted of 600 grams AAMH, 36 grams HNO$_3$, 47 grams CS1, 501 grams IO-4, and 1000 grams DWT2. The abrasive grain was sintered in the rotary kiln described above in Examples 1–4 at 1440° C.

The abrasive grain of Comparative Example B was the ceramic aluminum oxide abrasive grain used in "REGAL 983C" fibre discs of the 3M Company, made according to the general teachings of U.S. Pat. No. 4,314,827 (Leitheiser et al.); U.S. Pat. No. 4,744,802 (Schwabel); and U.S. Pat. No. 4,964,883 (Morris et al.). This abrasive grain contained alpha alumina, 1.2% iron oxide nucleating agent (calculated as Fe$_2$O$_3$), and 4.5% MgO.

The density and hardness of the abrasive grain of Examples 11 and were measured as described in Examples 1–4 and are listed in Table 7, below.

TABLE 7

| Example | Al$_2$O$_3$, % | Fe$_2$O$_3$, % | SiO$_2$, % | Density, g/cm$^3$ | Hardness, GPa |
|---|---|---|---|---|---|
| 11 | 97.3 | 1.2 | 1.5 | 3.91 | 20.6 |
| 12 | 97.3 | 1.2 | 1.5 | 3.85 | 19.5 |

The abrasive grain of Examples 11 and 12 and Comparative Example B were incorporated into coated abrasive discs and treated as described in Examples 1–4, above. The grinding test results are provided in Table 8, below.

TABLE 8

| | Grinding Data (12-minute test) | |
|---|---|---|
| Example | Total cut, g | Cut, % of Comp. B |
| Comp. B | 960 | 100 |
| 11 | 1183 | 123 |
| 12 | 1193 | 124 |

These examples demonstrate the improved grinding performance of certain embodiments of abrasive grain described herein compared to conventional abrasive grain containing Al$_2$O$_3$, Fe$_2$O$_3$, and MgO, but no SiO$_2$.

EXAMPLES 13–17 AND COMPARATIVE EXAMPLE C

The abrasive grain of Examples 13–15 were prepared according to the procedure outlined for Examples 1–4, except that each of the dispersions contained 1200 grams AAMH, 72 grams HNO$_3$, and 93 grams CS1. Further, the dispersion of Example 13 also included 264 grams IO-1 having 4.3% iron oxide (calculated on a theoretical oxide basis as Fe$_2$O$_3$), and 2986 grams DWT2; the dispersion of Example 14 also included 782 grams IO-7 and 2468 grams DWT2; and the dispersion of Example 15 also included 1442 grams IO-6 having 0.8% iron oxide (calculated on the theoretical oxide basis as Fe$_2$O$_3$) and 1808 grams DWT2. The sintering temperature was 1440° C.

The abrasive grain of Example 16 was prepared according to the procedure outlined for Examples 1–4 except that the dispersion contained 600 grams AAMH, 36 grams HNO$_3$, 1450 grams DWT2, 47 grams CS1, and 131 grams IO-1 having 4.3% iron oxide (calculated on a theoretical oxide basis as Fe$_2$O$_3$). The sintering temperature was 1430° C.

The abrasive grain of Example 17 was prepared according to the procedure outlined for Examples 1–4, except that the dispersion contained 3.5 kilograms AAMH, 210 grams HNO$_3$, 7.9 kilograms DWT2, 36 grams CS1, and 408 kilograms IO-1 having 6.5% iron oxide (calculated on a theoretical oxide basis as Fe$_2$O$_3$). Further, the dispersion was prepared by mixing the materials in a 5 gallon (19 liter) pail with a Gifford-Wood Homogenizer Mixer, model 3117-210 (available from Dumore Co. of Racine, Wis.). The dispersion was dried at 100° C. in a 45 cm by 75 cm by 5 cm aluminum tray. The sintering temperature was 1430° C.

Comparative Example C was abrasive grain made according to Example 9 of U.S. Pat. No. 5,201,916 (Berg et al.), the disclosure of which is incorporated herein by reference. The triangular-shaped abrasive grain comprised alpha alumina and an iron oxide nucleating material.

The density and the hardness of the abrasive grain of Examples 13–15 were measured as described in Examples 1–4 except the load was 300 grams. The results are listed in Table 9, below.

TABLE 9

| Example | Al$_2$O$_3$, % | Fe$_2$O$_3$, % | SiO$_2$, % | Density, g/cm$^3$ | Hardness, GPa |
| --- | --- | --- | --- | --- | --- |
| 13 | 97.3 | 1.2 | 1.5 | 3.90 | 21.0 |
| 14 | 97.3 | 1.2 | 1.5 | 3.88 | 21.1 |
| 15 | 97.3 | 1.2 | 1.5 | 3.75 | 17.4 |
| 16 | 97.3 | 1.2 | 1.5 | — | — |
| 17 | 98.8 | 1.0 | 0.2 | — | — |

The abrasive grain of Examples 13–15 were incorporated into coated abrasive discs and tested as described for Examples 1–4. The results are provided in Table 10, below.

TABLE 10

| Example | Total cut, g | Total cut, % of Ex. 13 |
| --- | --- | --- |
| 13 | 1877 | 100 |
| 14 | 1801 | 96 |
| 15 | 1545 | 82 |

The surface roughness height and periodicity of the abrasive grain of Examples 13 and 16, and Comparative Example C were determined by measuring the height and spacing of protrusions observed on magnified edges of the abrasive grain surfaces obtained by scanning electron microscopy (SEM) at magnifications of 6000× or greater. To obtain the "roughness period," a straight edge was laid along the edge of a representative portion of a photo-micrograph of the abrasive grain surface and a 90,000 Angstrom length of the abrasive grain surface was evaluated. The number of peaks along a line defined by the straight edge in the 90,000 Angstrom length were counted. This procedure was repeated in two other areas of the micrograph of the abrasive grain surface. The value of roughness period was an average of the three representative values expressed as an average distance, in Angstroms, between peaks.

To obtain the "surface roughness height," a straight edge was laid along the edge of a representative portion of the abrasive grain surface so that the edge just touched at least the two tallest peaks in a 50,000 Angstrom length. The maximum distance from the straight edge to the deepest valley in this 50,000 Angstrom length was the roughness height This procedure was repeated in two other areas of the abrasive grain surface. The value of roughess height was an average of the three representative values expressed in Angstroms. The surface roughness height and periodicity results are provided in Table 11, below.

TABLE 11

| Example | Roughness height, Angstroms | Periodicity, Angstroms |
| --- | --- | --- |
| 13 | 4227 | 7370 |
| 16 | 4667 | 7597 |
| Comp. C | 2333 | 10125 |

The amount of transgranular fracture in the alpha alumina ceramic abrasive grain of Examples 13–15 was evaluated by hand crushing a small number of abrasive grain (approximately 10–25) using tungsten carbide lined mortar and pestle (SPEX Catalog No. 3203, SPEX Industries, Edison, N.J.). The crushed abrasive grain was then secured to an SEM sample stub using conductive carbon paste, conductively coated with Au-Pd using an "Anitech Hummer VI Sputtering System" (Anitech Ltd., Springfield, Va.) and examined under a "JEOL 840A" scanning electron microscope (JEOL USA, Peabody, Mass.) at magnifications greater than 10,000× to identify and photograph the fractured abrasive grain surfaces. Transgranular fracture was quantified by drawing two diagonal lines each approximately 14.5 cm long from the upper left corner to the lower right corner and from the lower left corner to the upper right corner across an SEM photomicrograph (3.5 inches (8.9 cm) by 4.5 inches (11.4 cm)) of a fired cross-section of the samples taken at 15,000× magnification. The transgranular fracture was calculated by measuring the cumulative length of the diagonal line passing through transgranular fracture and dividing it by the length of the diagonal line. The percentage of transgranular fracture, shown in Table 12, was an average of two values obtained for each of the diagonal lines.

TABLE 12

| Example | Transgranular fracture, % |
| --- | --- |
| 13 | 65 |
| 14 | 70 |
| 15 | 91 |
| 17 | 52 |
| Comp. C | 0 |

These examples demonstrate significant improvement in the amount of transgranular fracture of certain embodiments of abrasive grain described herein compared to conventional abrasive grain containing Al$_2$O$_3$ and Fe$_2$O$_3$, but no SiO$_2$. These examples also demonstrate that abrasive grain containing SiO$_2$ have increased roughness height and decreased periodicity compared to abrasive grain without SiO$_2$.

EXAMPLES 18–20 AND COMPARATIVE EXAMPLE D

The abrasive grain for Examples 18–20 were made according to the procedure set forth above for Examples 1–4, except that the dispersion for each contained 600 grams AAMH, 36 grams HNO$_3$, 1450 grams DWT2, 131 grams IO-1 having 4.3% iron oxide (calculated on a theoretical oxide basis as $Fe_2O_3$). Further, the dispersion of Example 18 also contained 3.2 grams CS1; the dispersion of Example 19 also contained 47 grams CS1; and the dispersion of Example 20 also contained 250 grams CS1.

In addition, the calcined abrasive grain precursor of Examples 18–20 were sintered in a "RAPID-TEMP" furnace from CM Furnaces (Bloomfield, N.J.) initially set at a temperature of 1100° C., rather than sintered in the rotary kiln as described in Examples 1–4. For Example 18, the temperature of the furnace was raised from 1100° to 1315° C. in about 5 minutes, and the calcined abrasive grain precursor was sintered for 20 minutes at 1315° C. For Example 19, the temperature was raised from 1100° C. to 1430° C. and the calcined abrasive grain precursor was sintered for 30 minutes. For the calcined abrasive grain precursor of Example 20 the temperature was raised from 1100° C. to 1430° C. and the calcined abrasive grain precursor was sintered for 30 minutes. The densities of the abrasive grain of Examples 18–20 are listed in Table 13, below.

TABLE 13

| Example | $Al_2O_3$, % | $Fe_2O_3$, % | $SiO_2$, % | Density, g/cm³ |
| --- | --- | --- | --- | --- |
| 18 | 98.7 | 1.2 | 0.1 | 3.88 |
| 19 | 98.3 | 1.2 | 1.5 | 3.85 |
| 20 | 90.8 | 1.2 | 8.0 | 3.65 |

Comparative Example D was a grade 36 coated abrasive fiber disc commercially available from The 3M Company, of St. Paul, Minn., under the trade designation "984C REGAL" fibre disc.

Samples of Examples 18–20 and Comparative Example D were manually ground in a boron carbide mortar and passed through a 200 mesh sieve. X-ray diffraction data were obtained using a Philips vertical diffractometer, copper Kα radiation, and proportional detector registry of the scattered radiation. The diffractometer was fitted with automatic divergence slits, 0.2 mm receiving slit, and graphite monochromator. Survey scans were conducted on each sample within the 5–80 degree 2θ range in order to perform crystalline phase identification. Portions of each sample were mixed with a standard reference material (NIST SRM 640b Si powder) and rescanned within the 80–100 degree 2θ range. Peak locations were determined using a second derivative peak search and two-theta peak positions corrected using peak positions of the silicon internal standard. The resulting powder patterns were indexed and unit cell parameters calculated using the Philips "PCEXTEND" version of the Appleman least-squares cell refinement program. The "a" and "c" unit cell parameters are listed in Table 14, below, in Angstroms, with the errors listed in parenthesis. For example, the "a" parameter in Comparative Example D can range from 4.7596 Angstroms to 4.7598 Angstroms.

TABLE 14

| Example | Phase(s) | a, Angstroms | c, Angstroms |
| --- | --- | --- | --- |
| Comp. D | α-alumina | 4.7597(1) | 12.9986(2) |
| 18 | α-alumina | 4.7607(1) | 13.0017(3) |
| 19 | α-alumina | 4.7610(1) | 13.0011(4) |
| 20 | α-alumina and mullite | 4.7619(1) | 13.0004(2) |

These examples demonstrate the dilation of unit cell parameters a and c as a result of silica in the presence of iron oxide in alpha alumina-based ceramic abrasive grain.

EXAMPLES 21–25

The abrasive grain for Examples 21–25 were made according to the procedure set forth above in Examples 1–4 except that the dispersions for each contained 600 grams AAMH, 131 grams IO-1 having 4.3% iron oxide (calculated on a theoretical oxide basis as $Fe_2O_3$), 36 grams $HNO_3$, and 1400 grams DWT2, in addition to the materials listed in Table 15, below.

TABLE 15

| Example | Silica source | Alkali source |
| --- | --- | --- |
| 21 | 47 g CS1 | — |
| 22 | 23 g CS4 | — |
| 23 | 23 g CS4 | 0.12 g NaOH |
| 24 | 23 g CS4 | 0.25 g NaOH |
| 25 | 23 g CS4 | 0.57 g KOH |

The sintering temperature was 1435° C. The densities of the abrasive grain of Examples 21–25 are listed in Table 16, below. Further, the abrasive grain were incorporated into coated abrasive discs and the grinding performance tested as described in Examples 1–4. The grinding test results are provided in Table 16, below.

TABLE 16

| | | | | Grinding Data (12-minute test) | |
| --- | --- | --- | --- | --- | --- |
| Example | $Al_2O_3$, % | $Fe_2O_3$, % | $SiO_2$, % | Cut, % of Ex. 21 | Density, g/cm³ |
| 21 | 98.3 | 1.2 | 1.5 | 100 | 3.89 |
| 22 | 98.3 | 1.2 | 1.5 | 100 | 3.86 |
| 23 | 98.3 | 1.2 | 1.5 | 106 | 3.88 |
| 24 | 98.3 | 1.2 | 1.5 | 106 | 3.89 |
| 25 | 98.3 | 1.2 | 1.5 | 108 | 3.88 |

These examples demonstrate the enhancement of the effect of $SiO_2$ as a result of incorporation of an alkali metal salt in an alpha alumina-based ceramic abrasive grain.

EXAMPLES 26 AND 27

The abrasive grain of Examples 26 and 27 was made according to the procedure set forth above in Examples 1–4, except that each of these dispersions contained 600 grams AAMH, 36 grams $HNO_3$, and 1450 grams DWT2. Further, the dispersion of Example 26 also contained 137.6 grams IO-1 having 6.6% iron oxide (calculated on a theoretical oxide basis as $Fe_2O_3$) and 76.8 grams CS1; and the dispersion of Example 27 also contained 202.8 grams IO-1 having 6.6% iron oxide (calculated on a theoretical oxide basis as $Fe_2O_3$) and 48.0 grams CS1. The sintering temperature for Examples 26 and 27 were 1430° C. and 1400° C., respectively.

The abrasive grain of Examples 26 and 27 were incorporated into coated abrasive discs and the grinding performance tested as in Examples 1–4. The abrasive grain of Examples 26 and 27 had total cuts of 1629 grams and 1688 grams, respectively. The density and hardness of the abrasive grain of Examples 26 and 27 were measured and are listed in Table 17, below. As a comparison, the hardness of Comparative Examples B and C are 21 Gpa and 25 Gpa, respectively.

TABLE 17

| Example | Al$_2$O$_3$, % | Fe$_2$O$_3$, % | SiO$_2$, % | Density, g/cm$^3$ | Hardness, GPA |
|---|---|---|---|---|---|
| 26 | 95.6 | 1.9 | 2.5 | 3.91 | 25.2 |
| 27 | 95.6 | 2.9 | 1.5 | 3.94 | 24.5 |

The toughness of the abrasive grain of Examples 26 and 27 were calculated by measuring the crack lengths extending from the apices of the Vickers indents made using a 500-gram load with a "Leitz Miniload" microhardness tester. Fracture toughness ($K_{IC}$) was calculated according to the equation: $K_{IC} = F_N/(\pi c)^{3/2} \tan b$ (b=68°; F=Newtons of force on the indentor; c=½ crack length in meters). Each of the values is an average of 5 measurements. The fracture toughness of the abrasive grain of Examples 26 and 27 were 3.3 MPa·m$^{1/2}$ and 3.99 MPa·m$^{1/2}$, respectively. The fracture toughness of the abrasive grain of Comparative Examples B and C were 2.9 MPa·m$^{1/2}$ and 2.5 MPa·m$^{1/2}$, respectively. Samples for toughness were prepared in the same manner as samples for microhardness as described in Examples 1–4.

These examples demonstrate that certain embodiments of abrasive grain described herein possess improved hardness and/or toughness compared to conventional abrasive grain that do not contain silica.

EXAMPLES 28–30

For Example 28, a colloidal silica dispersion was prepared by diluting 0.38 gram CS5 with 50.0 ml DWT1 in a blender (Waring Model 5011, Waring Products Division, Dynamics Corporation of America, New Hartford, Conn.) with 850 DWT1 with 2 drops of concentrated HNO$_3$. This dispersion was added immediately after preparation to a dispersion of 11.34 gram IO-9 with rapid stirring. To this mixture was added 336.92 grams AAMH and 11 ml of concentrated HNO$_3$. The resulting dispersion was dispersed with high agitation in the blender. A solution of 4.6 grams AMM dissolved in 10 ml DWT1 was added to the blended dispersion to induce gelation. The sol was poured into a shallow aluminum tray, allowed to gel (approximately 10 minutes), and then dried at 95° C. in a forced air furnace overnight. The dried abrasive grain precursor was calcined by heating from 100° C. to 600° C. over a period of 1.5 hours in a box furnace (having a 9180 cm$^3$ heating chamber, from Lindberg, a Division of General Signal, Chicago, Ill.), crushed, and sintered in a "RAPID TEMP" furnace at 1400° C. for 5 minutes. The furnace was initially at room temperature, and heated to 1400° C. at a rate of about 100°–125° C./minute for the temperature range 500° C. to 1400° C.

The abrasive grain for Examples 29 and 30 were made as described for Example 28 except that the amount of CS5 was 0.75 gram and 1.88 gram, respectively.

The alpha alumina ceramic abrasive grain of Example 28 contained, on a theoretical oxide basis, 98.95% Al$_2$O$_3$, 1.0% Fe$_2$O$_3$, and 0.05% SiO$_2$; Example 29, 98.9% Al$_2$O$_3$, 1.0% Fe$_2$O$_3$, and 0.1% SiO$_2$; and Example 30, 98.75% Al$_2$O$_3$, 1.0% Fe$_2$O$_3$, and 0.25% SiO$_2$.

Samples of the Examples 28–30 abrasive grain were crushed using a tungsten carbide mortar and pestle, and the fracture surfaces examined using SEM. The average crystallite size of samples from Examples 28–30 were estimated to be about 0.8 micrometer, 0.5 micrometer, and 0.2–0.3 micrometer, respectively. These examples demonstrate that the crystallite size was found to decrease with an increasing level of silica.

EXAMPLES 31–34 AND COMPARATIVE EXAMPLE E

For Examples 31–34 and Comparative Example E, the amount of CS5 listed in Table 18, below, was diluted to 50 ml total volume with DWT1.

TABLE 18

| Example | CS5, grams |
|---|---|
| 31 | 1.10 |
| 32 | 2.21 |
| 33 | 5.51 |
| 34 | 11.43 |
| Comp. E | 0 |

This colloidal dispersion was added with rapid stirring to 340.90 grams of IO-8. The dispersion was well mixed during this addition using a high speed mixer ("OMNI 5000" mixer, OMNI International, Waterbury, Conn.). After mixing, the resulting dispersion was allowed to stand undisturbed for about 4 hours. Following this, 1040 grams of DWT1 and 340.90 grams of the silica/α-FeOOH dispersion were homogenized using a high speed mixer (Ross Model ME 100L mixer, Charles Ross & Son Co., Hauppauge, N.Y.), after which 671.1 grams of AAMH were added. While mixing at high speed, 26.0 ml concentrated HNO$_3$ were added. After mixing well, 10 ml of a solution prepared by dissolving 90.0 grams of AMM in 100 grams DWT1 was added with rapid stirring. The resulting sol was poured into shallow (3.25 cm) aluminum trays and left undisturbed to gel, approximately 10 minutes. After gelling, the trays were placed in a forced air furnace at 95° C. and dried. The dried abrasive grain precursor was fired in a box furnace to 650° C. over a period of 1.5 hours and then held at that temperature for 30 minutes. The calcined abrasive grain precursor was crushed and screened as outlined in Examples 1–4 and sintered at 1450° C. for 8 minutes as outlined in Example 28. Another sample of screened material was sintered at 1430° C. for 8 minutes as outlined in Example 28 and incorporated into abrasive articles as described in Examples 1–4.

The alpha alumina ceramic abrasive grain of Example 31 contained, on a theoretical oxide basis, 98.45% Al$_2$O$_3$, 1.48% Fe$_2$O$_3$, and 0.07% SiO$_2$, Example 32, 98.38% Al$_2$O$_3$, 1.48% Fe$_2$O$_3$, and 0.14% SiO$_2$; Example 33, 98.16% Al$_2$O$_3$, 1.47% Fe$_2$O$_3$, and 0.37% SiO$_2$; and Example 34, 97.8% Al$_2$O$_3$, 1.47% Fe$_2$O$_3$, and 0.73% SiO$_2$.

The grinding performance of the abrasive grain for each of Examples 31–34 was evaluated as described in Examples 1–4. The results are listed in Table 19, below.

TABLE 19

| Example | Nucleating material | Additive wt. based on total oxides, % | Total cut, % Comp. E |
|---|---|---|---|
| Comp. E | FeOOH | None (reference) | 100 |
| 31 | FeOOH | 0.075% SiO$_2$-CS5 | 121 |
| 32 | FeOOH | 0.15% SiO$_2$-CS5 | 119 |
| 33 | FeOOH | 0.37% SiO$_2$-CS5 | —[1] |
| 34 | FeOOH | 0.73% SiO$_2$-CS5 | 93[2] |

[1]This sample was too porous to test. It did not pass the red dye test described above. It is believed that this is because the sintering conditions were not optimized.
[2]It is believed that these samples had low grinding performance because the sintering conditions were not optimized.

SEM examination of Comparative Example E sintered at 1450° C. showed essentially fully dense material with an average crystallite size was 2–3 micrometers. The abrasive grain of Examples 31–34, which had been sintered at 1450°

C., appeared to be essentially fully dense but were composed of much finer crystallites. Example 31 had an apparent average crystallite size of approximately 0.5 micrometer, and Examples 32–34 each had an apparent average crystallite size of 0.4 micrometer or less.

These examples demonstrate that small amounts of silica can induce crystallite refinement and can enhance the grinding properties of iron oxide-nucleated alpha alumina-based ceramic abrasive grain.

EXAMPLES 35–36

Examples 35–36 illustrate the effect of reacting an α-FeOOH nucleating material with a hydrolyzable alkoxysilane prior to its use as a nucleating material in the alumina precursor. The alkoxysilane was reacted with the α-FeOOH nucleating material in the following manner. For Examples 35 and 36, 2.8 ml and 7.0 ml TEOS, respectively, were added with rapid stirring to 340.90 grams IO-8. The resulting dispersions were well mixed during these additions using a high speed mixer ("OMNI 5000," OMNI International, Waterbury, Conn.). Three drops of concentrated $HNO_3$ were added with stirring to each dispersion and the mixtures were allowed to react for about 24 hours with occasional remixing. Examples 35–36 were prepared in the same manner as set forth above for Examples 31–34 except sintering was at 1450° C. for 5 minutes.

The alpha alumina ceramic abrasive grain of Example 35 contained, on a theoretical oxide basis, 98.38% $Al_2O_3$, 1.48% $Fe_2O_3$, and 0.148% $SiO_2$; and Example 36 contained, on a theoretical oxide basis, 98.16% $Al_2O_3$, 1.47% $Fe_2O_3$, and 0.37% $SiO_2$.

SEM examination showed Examples 35 and 36 were substantially dense and composed of crystallites with average diameters of less than 0.5 micrometer. Comparative Example E, however, had an average crystallite size of about $2≧3$ micrometers. The percentage of transgranular fracture for Examples 35 and 36 were 49% and 51%, respectively.

The grinding performance of the abrasive grain for each of Examples 35 and 36 was evaluated as described in Examples 1–4. The results are listed in Table 20, below.

TABLE 20

| Example | Nucleating material | Additive wt. based on total oxides, % | Total cut, % Comp. H |
|---|---|---|---|
| 35 | FeOOH | 0.15% $SiO_2$-TEOS | 94[1] |
| 36 | FeOOH | 0.37% $SiO_2$-TEOS | 110 |

[1]It is believed that these samples had low grinding performance because the sintering conditions were not optimized.

These examples demonstrate the use of a hydrolyzable organosilane as a silica precursor in an iron oxide-nucleated alpha alumina-based ceramic abrasive grain.

COMPARATIVE EXAMPLES F, G, AND H (ALUMINA-SEEDED ABRASIVE GRAIN)

Comparative Example F was prepared by charging a large beaker with 1360 grams of DWT1 and 20.2 grams of SAS. This dispersion was homogenized using a high speed mixer (Ross Model ME 100L, Charles Ross & Son Co., Hauppauge, N.Y.) to form an alumina seed sol. To this mixture was added 671.1 grams of AAMH. While mixing at high speed, 26.0 ml of $HNO_3$ was added. After mixing well, 10 ml of a solution prepared by dissolving 90.0 grams of AMM in 100 grams of DWT1 was added with rapid stirring. The material was dried and crushed as outlined in Examples 35 and 36.

For Comparative Examples G and H, respectively, 100 grams of the alumina seed sol prepared as described for Comparative Example F were combined with 1.42 ml and 15.6 ml TEOS, respectively, with rapid stirring. These mixtures were allowed to hydrolyze while stirring for about 20 hours. Comparative Examples G and H were prepared in the same manner as Comparative Example F except that 20.44 grams and 23.12 grams, TEOS treated alumina seed, respectively, was used.

SEM examination of the products of Comparative Examples F–H showed that after sintering at 1450° C. for 5 minutes the abrasive grain of Comparative Example F appeared to be more dense than Comparative Examples G or H. Comparative Examples G and H, while being composed of very fine crystallites, showed evidence of vermicular (i.e., porous) or non-seeded microstructure.

Samples of the abrasive grain of Comparative Examples F–H were incorporated into abrasive articles and tested as described in Examples 1–4. The grinding performance results are listed in Table 21, below.

TABLE 21

| Example | Nucleating agent or seed | Additive wt. based on total oxides, % | Total cut, % Comp. F |
|---|---|---|---|
| Comp. F | $Al_2O_3$ | None (reference) | 100 |
| Comp. G | $Al_2O_3$ | 0.015%-TEOS | 43 |
| Comp. H | $Al_2O_3$ | 0.15%-TEOS | 59 |

These comparative examples demonstrate that the incorporation of silica in alpha alumina-nucleated abrasive grain decreases grinding performance, in contrast to iron oxide-nucleated abrasive grain.

EXAMPLE 37

Example 37 demonstrates introduction of the silica into the abrasive grain by impregnation of the porous, calcined abrasive mineral precursor with a silica precursor. Calcined abrasive grain precursor was prepared as described in Comparative Example E. The calcined abrasive grain precursor was crushed and screened as described in Examples 31–34.

A hydrolyzed TEOS impregnation solution was prepared by mixing 6.0 ml TEOS in 75 ml DWT1 containing 3 drops of concentrated $HNO_3$. This solution was magnetically stirred for about 5 hours prior to use. To impregnate the calcined abrasive grain precursor, the partially hydrolyzed TEOS solution was added to 162 grams of the calcined abrasive grain precursor and the mass mixed by hand in a small beaker using a spatula. The impregnated alumina-based grain precursor was placed in a small jar, sealed with a screw-type lid and aged at 85° C. for 12 hours. The lid was removed from the jar and the impregnated alumina-based grain precursor was dried in the oven at 85° C. The impregnated alumina-based grain precursor was calcined to 600° C. and sintered at 1430° C. for 8 minutes as described in Comparative Example E. The alpha alumina ceramic abrasive grain of Example 37 contained, on a theoretical oxide basis, 97.55% $Al_2O_3$, 1.46% $Fe_2O_3$, and 0.99% $SiO_2$.

The abrasive grain of Example 37 was incorporated into a coated abrasive disc and tested as described in Examples 1–4. The total cut of the Example 37 abrasive grain was 123% of Comparative Example F (100%).

This example demonstrates that impregnation of calcined abrasive grain precursor with a source of silica can be used to enhance the grinding performance of the resultant abrasive grain.

EXAMPLE 38

The abrasive grain of Example 38 was prepared as described in Comparative Example E except that 1.87 grams CS6 was diluted with DWT1 to a final volume of 5 ml and added to the $HNO_3$/AAMH/α-FeOOH sol mixture prior to the addition of AMM. After the addition of the alumina coated colloidal silica, the AMM solution was added as in Comparative Example E to induce gelation. The alpha alumina ceramic abrasive grain of Example 38 contained, on a theoretical oxide basis, 98.45% $Al_2O_3$, 1.48% $Fe_2O_3$, and 0.07% $SiO_2$.

The abrasive grain of Example 38 was incorporated into a coated abrasive product and tested as outlined in Examples 1–4. The total cut of Example 38 abrasive grain was 120% of Comparative Example F.

This example demonstrates that alumina-coated colloidal silica can be used to enhance the grinding performance of the resultant abrasive grain.

EXAMPLES 39–42

Examples 39–42 were prepared according to the procedure as outlined for Examples 1–4, except 600 grams of AAMH, 36 grams of $HNO_3$, 1300 grams of DWT2, and 234 grams of IO-1 having 2.4% iron oxide (calculated on a theoretical oxide basis as $Fe_2O_3$) were used. The amount and source of silica used are listed in Table 22, below. The abrasive grain were sintered as in Examples 1–4 at 1440° C.

TABLE 22

| Example | Silica Source |
| --- | --- |
| 39 | 47 g CS1 |
| 40 | 14 g CS7 |
| 41 | 14 g CS8 |
| 42 | 42 g CS8 |

The abrasive grain of Examples 39–42 were incorporated into coated abrasive products and tested as described in Examples 1–4. Two discs of each abrasive grain were tested. The density, hardness, and grinding data for each abrasive grain were obtained as described above in Examples 1–4. The grinding data for each abrasive grain was also obtained under high pressure grinding conditions as described in Examples 1–4 except that 8 kg pressure was applied. The results are listed in Table 23, below.

TABLE 23

| Example | Density, g/cm³ | Hardness, GPa | Total Cut at Low Pressure, % Ex. 41 | Total Cut at High Pressure, % Ex. 41 |
| --- | --- | --- | --- | --- |
| 39 | 3.91 | 20.8 | 100 | 125 |
| 40 | 3.90 | 20.6 | 103 | 120 |
| 41 | 3.88 | 21.7 | 99 | 130 |
| 42 | 3.76 | 17.5 | 94 | 122 |

These examples demonstrate that a variety of small silica particle sizes (e.g., less than about 150 nanometers) can be used to produce similar enhanced grinding performance.

COMPARATIVE EXAMPLES I–K

The transgranular fracture of three separate samples of alpha alumina-based ceramic abrasive grain, which were believed to be made according to U.S. Pat. No. 4,623,364 (Cottringer et al.), were measured according to the procedure described above in Examples 13–17. The abrasive grain samples were obtained from the following abrasive grain articles, each of which is available from Norton Company, Worcester, Mass.: 42-inch crank grinding wheel; "F944" SG Grade 50 fibre disc; and fibre disc containing SG rods. Although it is not clear how these abrasive grain were made, no elements other than Al and O were detected by Energy Dispersive X-ray Microanalysis. Each of these samples had a transgranular fracture of less than 10%.

Because it was uncertain how these samples were made, Examples II, IV, and X of U.S. Pat. No. 4,623,364 (Cottringer et al.) were repeated to determine the amount of transgranular fracture that results from the silica and iron oxide impurities in the alumina milling media.

Abrasive grain of Comparative Example I were prepared according to the procedure of Example II of Cottringer et al. (scaled down by a factor of 20) using 1.135 kg of AAMH ("PURAL" microcrystalline boehmite), 11.25 liters of DWT1, and 0.675 liter of 14% $HNO_3$ (prepared by mixing 135 ml of concentrated $HNO_3$ with 545 ml of DWT1). The "PURAL" was mixed with the water in a large plastic mixing vessel and the acid was added while mixing with a Ross mixer (Model ME 100L from Charles Ross & Son Co., Hauppauge, N.Y.). The mixture was mixed well for 10–15 minutes at high speed. A portion (5–6 liters) of this mixture was transferred to a Sweco vibrofinishing mill (⅓ HP) containing Coors ceramic bonded alumina (0.5×0.5 inch rod media available under the trade designation "ABP", Coors Porcelain Co.). The milling media contained 89.3% $Al_2O_3$, 6.7% $SiO_2$, 2.5% MgO, and 0.8% CaO. X-ray diffraction of the media revealed that the media contained alpha alumina, magnesia alumina spinel, and small amounts of orthoclase and plagioclase. Thus, U.S. Pat. No. 4,623,364 (Cottringer et al.) which discloses the use of ceramic bonded alumina milling media containing crystalline silicon-containing impurities. The mixture was milled for 2 hours in the Sweco mill. The gel was poured into glass trays to a depth of 6–7 cm and was dried in an oven at 200° C. for 30 hours. (Initially, aluminum trays were used for drying as taught by Cottringer et al.; however, the resulting abrasive material was slightly pink in color and possessed a less dense and coarser microstructure than when dried in glass trays.) The dried solids were calcined at 450° C. for 16 hours. The calcined gel was sintered at 1400° C. for 1 hour. The resulting material was white and possessed a microstructure composed of large lathe-like crystals up to about 5 micrometers in length together with a lesser amount of fine submicron crystals.

Abrasive grain of Comparative Example J were prepared according to the procedure of Example IV of Cottringer et al. (scaled down by a factor of 10) using 1.36 kg of AAMH ("PURAL" microcrystalline boehmite), 13.6 liters of DWT1, 0.41 liter of 14% $HNO_3$ (prepared by mixing 82 ml of concentrated $HNO_3$ with 328 ml of DWT1), and 0.34 kg of magnesium nitrate hydrate dissolved in 1.37 liters of DWT1. The "PURAL" was mixed with the water in a large plastic mixing vessel and the acid was added while mixing with a Ross mixer (Model ME 100L from Charles Ross & Son Co., Hauppauge, N.Y.). The magnesium nitrate solution was then added while mixing. The mixture was mixed well for 10–15 minutes at high speed. A portion (5–6 liters) of this mixture was transferred to a Sweco vibro-finishing mill (⅓ HP) containing the Coors ceramic bonded alumina described above in Comparative Example I. The mixture was milled for 2 hours in the Sweco mill. The gel was poured into aluminum trays to a depth of 6–7 cm and was dried in an oven at 200° C. for 30 hours. The dried solids were calcined at 600° C. for 0.5 hour (ramp time to this temperature=1 hour). The calcined gel was sintered at 400° C. for 1 minute. The abrasive grain was white and possessed 32% transgranular fracture.

Abrasive grain of Comparative Example K were prepared according to the procedure of Example X of Cottringer et al. (scaled down by a factor of 20) using 0.68 kg of AAMH ("PURAL" microcrystalline boehmite), 6.8 liters of DWT1, and 0.205 liter of 14% $HNO_3$ (prepared by mixing 41.0 ml of concentrated $HNO_3$ with 164.0 ml of DWT1). The "PURAL" was mixed with the water in a large plastic mixing vessel and the acid was added while mixing with a Ross mixer (Model ME 100L from Charles Ross & Son Co., Hauppauge, N.Y.). The mixture was mixed well for 10–15 minutes at high speed. A portion (5–6 liters) of this mixture was transferred to a Sweco vibro-finishing mill (⅓ HP) containing the Coors ceramic bonded alumina described above in Comparative Example I. The mixture was milled for 2 hours in the Sweco mill. The gel was poured into glass trays to a depth of 6–7 cm and was dried in an oven at 200° C. for 30 hours. (Initially aluminum trays were used for drying as taught by Cottringer et al.; however, the abrasive grain was slightly pink in color and possessed a less dense microstructure than when dried in glass trays.) The dried solids were calcined at 450° C. for 16 hours. The calcined gel was sintered at 1400° C. for 15 minutes. The abrasive grain was white and possessed 32% transgranular fracture.

The elemental analyses of the material of Comparative Examples I–K was measured by ICP Analysis (Inductively Coupled Plasma). The abrasive grain samples (0.1 gram) were fused with $Li_2B_4O_7$ (1 gram), dissolved in 100 ml 5% nitric acid, and diluted to 250 ml with deionized water. They were analyzed with an Applied Research Laboratories Inductively Coupled Plasma Spectrometer Model 3580, Fison Instrument Co., of Beverly, Mass. The analyses of Comparative Examples I and J were of alpha alumina-based ceramic abrasive grain, whereas the analysis of Comparative Example K was of the material obtained upon heating at 450° C. for 16 hours, but before sintering. The results are listed in Table 24, below, and are listed as the weight percent on a theoretical oxide basis.

TABLE 24

| Metal Oxide | Comp. I | Comp. J | Comp. K |
| --- | --- | --- | --- |
| $Al_2O_3$ | 99.0 | 94.0 | 70.6 |
| BaO | 0.12 | 0.12 | 0.025 |
| CaO | 0.048 | 0.060 | <0.03 |
| $Fe_2O_3$ | 0.024 | <0.01 | <0.01 |
| MgO | 0.14 | 5.05 | 0.007 |
| $MnO_2$ | 0.019 | <0.005 | <0.005 |
| $Na_2O$ | <0.05 | <0.05 | <0.05 |
| $SiO_2$ | 0.50 | 0.39 | <0.03 |
| $TiO_2$ | 0.14 | 0.12 | 0.069 |

Various modifications and alterations of this invention will become apparent to those skilled in the art without departing from the scope and spirit of the invention. It should be understood that this invention is not to be unduly limited to the illustrative embodiments set forth herein.

What is claimed is:

1. Alpha alumina-based ceramic abrasive grain comprising, on a theoretical oxide basis, $Al_2O_3$, $SiO_2$, and at least about 0.25% by weight $Fe_2O_3$, having alpha alumina crystallites with an average crystallite size of less than about 0.5 micrometer; said abrasive grain having a surface roughness height of greater than about 200 nanometers and a density of greater than about 3.5 g/cm³.

2. The abrasive grain of claim 1 wherein said $SiO_2$ is present in an amount sufficient to provide said abrasive grain with an increased amount of transgranular fracture.

3. The abrasive grain of claim 1 wherein said $SiO_2$ is present in an amount sufficient to provide said abrasive grain with at least about 50% transgranular fracture.

4. The abrasive grain of claim 1 further comprising about 0.01–1.0% by weight of alkali metal oxide, on a theoretical oxide basis.

5. The abrasive grain of claim 1 wherein said $SiO_2$ is present in an amount sufficient to increase at least one unit cell dimension of alpha alumina crystallites forming said abrasive grain by at least about 0.01%.

6. The abrasive grain of claim 1 wherein said $SiO_2$ is present in an amount sufficient to increase at least one unit cell dimension of said abrasive grain by at least about 0.02%.

7. The abrasive grain of claim 1 having an abrasive grain size of greater than about 100 micrometers.

8. The abrasive grain of claim 1 comprising, on a theoretical oxide basis, about 0.25–10.0% by weight $Fe_2O_3$ and about 0.1–20.0% by weight $SiO_2$, based on the total weight of said abrasive grain.

9. The abrasive grain of claim 1 comprising, on a theoretical oxide basis, about 85.0–98.0% by weight $Al_2O_3$, about 1.0–2.0% by weight $Fe_2O_3$, and about 1.0–2.0% by weight $SiO_2$, based on the total weight of said abrasive grain.

10. The abrasive grain of claim 9 further comprising about 0.01–0.12% by weight of alkali metal oxide, on a theoretical oxide basis.

11. The abrasive grain of claim 1 comprising alpha alumina crystallites having an average crystallite size of less than about 0.3 micrometer.

12. The abrasive grain of claim 1 having an average hardness of at least about 16 GPa.

13. The abrasive grain of claim 1 having an average toughness of at least about 2.5 MPa·m$^{1/2}$.

14. The abrasive grain of claim 1 which is a rod or a triangular plate.

15. An abrasive article comprising:
   (a) a binder; and
   (b) a plurality of abrasive grain according to claim 1 secured within said article by said binder.

16. The abrasive article of claim 15 which is a coated abrasive.

17. The abrasive article of claim 15 which is a bonded abrasive.

18. The abrasive article of claim 17 which is a bonded abrasive wheel.

19. The abrasive article of claim 15 which is a nonwoven abrasive.

20. An alpha alumina-based ceramic abrasive grain comprising, on a theoretical oxide basis, $Al_2O_3$, $Fe_2O_3$, $SiO_2$, and at least about 0.05% by weight of an alkali metal oxide, having alpha alumina crystallites with an average crystallite size of less than about 0.5 micrometer, and said abrasive grain having a density of greater than about 3.5 g/cm³.

21. The abrasive grain of claim 20 having a surface roughness height of greater than about 200 nanometers.

22. The abrasive grain of claim 20 wherein said abrasive grain is nontranslucent.

23. The nontranslucent abrasive grain of claim 22 wherein said $SiO_2$ is present in an amount sufficient to increase at least one unit cell dimension of said abrasive grain by at least about 0.01%.

24. An abrasive article comprising:
   (a) a binder; and (b) a plurality of abrasive grain according to claim 20 secured within said article by said binder.

25. The abrasive article of claim 24 which is a coated abrasive.

26. The abrasive article of claim 24 which is a bonded abrasive.

27. The abrasive article of claim 26 which is a bonded abrasive wheel.

28. The abrasive article of claim 24 which is a nonwoven abrasive.

29. A nontranslucent alpha alumina-based ceramic abrasive grain having a surface roughness height of greater than about 200 nanometers, a density of greater than about 3.5 g/cm$^3$, and an average crystallite size of less than about 0.5 micrometer; said abrasive grain comprising, on a theoretical oxide basis, about 85.0–99.6% by weight $Al_2O_3$, about 0.25–5.0% by weight $Fe_2O_3$, about 0.1–5.0% by weight $SiO_2$, and about 0.01–1.0% by weight of alkali metal oxide, based on the total weight of said abrasive grain.

30. The nontranslucent abrasive grain of claim 29 having at least about 50% transgranular fracture.

31. The nontranslucent abrasive grain of claim 29 having an average hardness of at least about 16 GPa.

32. The nontranslucent abrasive grain of claim 29 having an average toughness of at least about 2.5 MPa·m$^{1/2}$.

33. The nontranslucent abrasive grain of claim 29 free of MgO.

34. The nontranslucent abrasive grain of claim 29 wherein at least one unit cell dimension of alpha alumina crystallites forming said abrasive grain is increased by at least about 0.01%.

35. An abrasive article comprising:

(a) a binder; and (b) a plurality of abrasive grain according to claim 29 secured within said article by said binder.

36. The abrasive article of claim 35 which is a coated abrasive.

37. The abrasive article of claim 35 which is a bonded abrasive.

38. The abrasive article of claim 37 which is a bonded abrasive wheel.

39. The abrasive article of claim 35 which is a nonwoven abrasive.

40. Alpha alumina-based ceramic abrasive grain consisting essentially of, on a theoretical oxide basis, $Al_2O_3$, $Fe_2O_3$, and $SiO_2$, having alpha alumina crystallites with an average crystallite size of less than about 0.5 micrometer; said abrasive grain having a surface roughness height of greater than about 200 nanometers and a density of greater than about 3.5 g/cm$^3$.

41. The abrasive grain of claim 40 wherein said $Fe_2O_3$ is present in an amount of at least about 0.25% by weight, based on the total weight of said abrasive grain.

42. The abrasive grain of claim 41 wherein said $SiO_2$ is present in an amount of at least about 0.5% by weight, based on the total weight of said abrasive grain.

43. The nontranslucent abrasive grain of claim 41 having at least about 50% transgranular fracture.

44. An abrasive article comprising:

(a) a binder; and (b) a plurality of abrasive grain according to claim 40 secured within said article by said binder.

45. The abrasive article of claim 44 which is a coated abrasive.

46. The abrasive article of claim 44 which is a bonded abrasive.

47. The abrasive article of claim 45 which is a bonded abrasive wheel.

48. The abrasive article of claim 44 which is a nonwoven abrasive.

* * * * *